US008010550B2

(12) United States Patent
Duffy et al.

(10) Patent No.: US 8,010,550 B2
(45) Date of Patent: *Aug. 30, 2011

(54) PARALLELIZING SEQUENTIAL FRAMEWORKS USING TRANSACTIONS

(75) Inventors: John Joseph Duffy, Renton, WA (US); Jan Gray, Bellevue, WA (US); Yosseff Levanoni, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1095 days.

This patent is subject to a terminal disclaimer.

(21) Appl. No.: 11/810,121

(22) Filed: Jun. 4, 2007

(65) Prior Publication Data

US 2008/0120299 A1     May 22, 2008

Related U.S. Application Data

(63) Continuation-in-part of application No. 11/601,541, filed on Nov. 17, 2006, now Pat. No. 7,711,678.

(51) Int. Cl.
  *G06F 17/30* (2006.01)
(52) U.S. Cl. ........................................ 707/764; 707/713
(58) Field of Classification Search .................. 707/764, 707/760
  See application file for complete search history.

(56) References Cited

U.S. PATENT DOCUMENTS

| | | | |
|---|---|---|---|
| 4,884,228 A | 11/1989 | Stanley | |
| 5,241,675 A | 8/1993 | Sheth et al. | |
| 5,335,343 A | 8/1994 | Lampson et al. | |
| 5,701,480 A | 12/1997 | Raz | |
| 6,011,921 A | 1/2000 | Takahashi | |
| 6,014,741 A | 1/2000 | Mahalingaiah | |
| 6,016,399 A | 1/2000 | Chang | |
| 6,088,705 A | 7/2000 | Lightstone | |
| 6,507,947 B1 * | 1/2003 | Schreiber et al. | 717/160 |
| 6,557,048 B1 | 4/2003 | Keller | |
| 6,574,725 B1 | 6/2003 | Kranich | |
| 6,615,403 B1 | 9/2003 | Muthukumar | |
| 6,704,861 B1 | 3/2004 | McKeen | |
| 6,754,737 B2 | 6/2004 | Heynemann et al. | |

(Continued)

FOREIGN PATENT DOCUMENTS

EP      01197876 A2     4/2002

(Continued)

OTHER PUBLICATIONS

Costich, Oliver, "Transition Processing Using an Untrusted Scheduler in a Multilevel Database with Replicated Architecture", North-Holland, 1992, 17 pages.

(Continued)

*Primary Examiner* — Baoquoc To

(57) ABSTRACT

Various technologies and techniques are disclosed for transforming a sequential loop into a parallel loop for use with a transactional memory system. A transactional memory system is provided. A first section of code containing an original sequential loop is transformed into a second section of code containing a parallel loop that uses transactions to preserve an original input to output mapping. For example, the original sequential loop can be transformed into a parallel loop by taking each iteration of the original sequential loop and generating a separate transaction that follows a pre-determined commit order process. At least some of the separate transactions are executed in different threads. When an unhandled exception is detected that occurs in a particular transaction while the parallel loop is executing, state modifications made by the particular transaction and predecessor transactions are committed, and state modifications made by successor transactions are discarded.

18 Claims, 25 Drawing Sheets

U.S. PATENT DOCUMENTS

| | | | |
|---|---|---|---|
| 6,785,779 B2 | 8/2004 | Berg et al. | |
| 7,089,253 B2 | 8/2006 | Hinshaw et al. | |
| 7,146,366 B2 | 12/2006 | Hinshaw et al. | |
| 2002/0092002 A1 | 7/2002 | Babaian | |
| 2003/0061255 A1* | 3/2003 | Shah et al. | 709/100 |
| 2003/0078910 A1 | 4/2003 | Kanai | |
| 2003/0115276 A1 | 6/2003 | Flaherty et al. | |
| 2003/0120669 A1 | 6/2003 | Han | |
| 2004/0015642 A1 | 1/2004 | Moir et al. | |
| 2004/0064439 A1 | 4/2004 | Hinshaw et al. | |
| 2004/0148150 A1 | 7/2004 | Ashar et al. | |
| 2004/0230960 A1 | 11/2004 | Nair | |
| 2004/0236659 A1 | 11/2004 | Cazalet et al. | |
| 2005/0193286 A1 | 9/2005 | Thatte et al. | |
| 2005/0210185 A1 | 9/2005 | Renick | |
| 2005/0283769 A1 | 12/2005 | Eichenberger et al. | |
| 2006/0026130 A1 | 2/2006 | Botzer | |
| 2006/0112248 A1 | 5/2006 | Meiri et al. | |
| 2006/0190504 A1 | 8/2006 | Pruet | |
| 2006/0218206 A1 | 9/2006 | Bourbonnais et al. | |
| 2007/0011684 A1 | 1/2007 | Du | |
| 2007/0113056 A1 | 5/2007 | Dale | |
| 2007/0169059 A1 | 7/2007 | Halambi | |
| 2007/0198518 A1 | 8/2007 | Luchangco et al. | |
| 2008/0120298 A1 | 5/2008 | Duffy | |

FOREIGN PATENT DOCUMENTS

| | | |
|---|---|---|
| JP | A-H05-197604 | 6/1993 |
| JP | A-H10-049420 | 2/1998 |
| JP | A-2004-532480 | 10/2004 |
| JP | A-2006-501585 | 1/2006 |
| KR | 10-2005-0054380 A | 6/2005 |
| WO | WO/96/23254 | 8/1996 |
| WO | WO01/13202 A2 | 2/2001 |
| WO | WO 02/095632 | 11/2002 |
| WO | WO 2004/013725 A2 | 2/2004 |
| WO | 2007016302 A2 | 2/2007 |
| WO | WO 2007-016302 | 2/2007 |

OTHER PUBLICATIONS

Dekeyser, et al., "Conflict Scheduling of Transactions on XML Documents", Australian Computer Society Inc., 2004. vol. 27, 30 pages.

Yeo, et al., "Linear Orderability of Transactions in Mobile Environment with Hetergeneous Databases", Peninsula School of Computing and Information Technology, Monash University, Australia, 1996, 9 pages.

International Search Report dated Oct. 28, 2008 for Application No. PCT/US2008/065362, 11 pages.

Chung, et al. "The Common Case Transactional Behavior of Multithreaded programs", High-Performance Computer Architecture, 12th International Symposium, IEEE, Feb. 2006, 12 pages.

Wolfe, M. "High Performance Compilers for Parallel Computing", Redwood City; Addison-Wesley, 1996, ISBN 0-8053-4. Chapters 5-7, 9, 11. 222 pages.

Frigo, et al. "The implementation of the Cilk-5 Multithread Language", Retrieved at http://supertech.csail.mit.edu/papers/cilk5.pdf, in the proceedings of the ACM SIGPLAN '98 Conference on Programming Language Design and implementation, vol. 33, Issue 5, May 1998, pp. 1-12.

Welc, et al. "Safe Futures for Java", Retrieved at http://www.cs.purdue.edu/homes/suresh/papers/oopsla05.pdf, Proceedings of the 20th annual ACM SIGPLAN conference on Object-oriented programming, systems, languages, and applications, Oct. 16-20, 2005, pp. 439-453.

Hammond, et al., "Programming with Transactional Coherence and Consistency (TCC)", ASPLOS 2004, Oct. 7-13, 2004, Boston, Massachusetts, USA. Retrieved at http://tcc.stanford.edu/publications/tcc_asplos2004.pdf, pp. 1-13.

International Search Report, Application No. PCT/US2008/066144, dated Nov. 27, 2008, 10 pages.

International Search Report, Application No. PCT/US2008/065363, mailed Oct. 29, 2008, 10 pages.

International Search Report, Application No. PCT/US2007/085035, mailed Mar. 21, 2008, 11 pages.

Shavit, Nir, "Software Transactional Memory", In Proceedings of the 14th Symposium on Principles of Distributed Computing, Ottawa: ACM, 1995, 10 pages.

U.S. Appl. No. 11/601,541, Non-Final Office Action mailed Jun. 12, 2009, 6 pages.

U.S. Appl. No. 11/601,541, Amendment in response to Final Office Action, filed Jun. 2, 2009, 10 pages.

Japanese Patent Application No. 2009-537403, Notice of Rejection mailed Nov. 5, 2010, English Translation, 2 pages.

U.S. Appl. No. 11/601,541, Final Office Action mailed Apr. 7, 2009, 12 pages.

U.S. Appl. No. 11/601,541, Amendment in response to Non-Final Office Action, filed Dec. 12, 2008, 12 pages.

U.S. Appl. No. 11/601,541, Notice of Allowance, dated Dec. 31, 2009, 6 pages.

U.S. Appl. No. 11/601,541, Amendment in response to Non-Final Office Action, filed Sep. 3, 2009, 8 pages.

Voluntary Claim amendments filed in Chinese Patent Application No. 20080018391.2, filed Jul. 1, 2010, 6 pages.

Chilean Patent Application No. CL200801531, Office Action dated Apr. 22, 2010, 5 pages.

Chilean Patent Application No. CL200801531, Response to Office Action, filed Jun. 8, 2010, 37 pages.

U.S. Appl. No. 11/601,541, Non-Final Office Action mailed Sep. 22, 2008, 8 pages.

U.S. Appl. No. 11/820,556, Notice of Allowance, dated Aug. 20, 2010, 13 pages.

U.S. Appl. No. 11/820,556, Amendment in Response to Non-Final Office Action, filed May 5, 2010, 12 pages.

U.S. Appl. No. 11/820,556, Non-Final Office Action mailed Feb. 5, 2010, 7 pages.

Japanese Patent Application No. 2009-537403, Notice of Rejection, dated Nov. 5, 2010, 2 pages.

EP Patent Application No. EP07845108.5, extended European Search Report, dated Sep. 16, 2010, 7 pages.

Chinese Patent Application No. 200780042809.9, Voluntary Claim amendments filed Jan. 4, 2010, 9 pages.

Chinese Patent Application No. 200780042809.9, Response to Office Action, dated Dec. 9, 2010, 36 pages.

Voluntary Claim amendments filed in Chinese Patent Application No. 20080018922.8, filed Jun. 30, 2010, 7 pages.

Chinese Patent Application No. 200780042809.9, Office Action dated Aug. 20, 2010, 12 pages.

Lance Hammond, et al., "Transactional Coherence and Consistency: Simplifying Parallel Hardware and Software", 2004, IEEE Computer Socket, pp. 92-103.

Stanley Lippmann, et al., "C++ Primer", Apr. 2, 1998, Addison-Wesley Professional, 3rd Edition, section 5.5, 5.7 and 5.8. 12 pages.

U.S. Appl. No. 11/810,111, Non-Final Office Action mailed Dec. 27, 2010, 28 pages.

Japanese Patent Application No. 2009-537403, Response to Notice of Rejection, filed Feb. 3, 2011, 8 pages.

EP Patent Application No. EP08770359, extended European Search Report, dated Dec. 29, 2010, 6 pages.

EP Patent Application No. EP07845108.5, Response to Extended European Search Report, dated Mar. 23, 2011, 15 pages.

U.S. Appl. No. 11/820,556, Response to Non-Final Office Action filed Mar. 28, 2011, 14 pages.

* cited by examiner

TRANSACTIONAL MEMORY APPLICATION WITH PARALLEL LOOP SUPPORT 500

PROGRAM LOGIC 504

LOGIC FOR PROVIDING A TRANSACTIONAL MEMORY SYSTEM 506

LOGIC FOR TRANSFORMING A FIRST SECTION OF CODE CONTAINING AN ORIGINAL SEQUENTIAL LOOP INTO A SECOND SECTION OF CODE CONTAINING A PARALLEL LOOP THAT USES TRANSACTIONS TO PRESERVE AN ORIGINAL INPUT TO OUTPUT MAPPING AND IMPROVE SAFETY 508

LOGIC FOR PLACING ONE OR MORE OF THE ITERATIONS OF THE ORIGINAL SEQUENTIAL LOOP INTO A SEPARATE ONE OF THE TRANSACTIONS IN THE PARALLEL LOOP 510

LOGIC FOR PRESERVING AN ORIGINAL INPUT TO OUTPUT MAPPING BY COMMITTING THE TRANSACTIONS USING A PRE-DETERMINED COMMIT ORDER THAT IS CONSISTENT WITH AN EXECUTION ORDER OF THE ORIGINAL SEQUENTIAL LOOP 512

LOGIC FOR USING A COMMIT ARBITRATOR TO DETECT AND HANDLE CONFLICTS IN THE PARALLEL LOOP IF THE ORIGINAL SEQUENTIAL LOOP CONTAINS OPERATIONS THAT MODIFY DATA 514

LOGIC FOR GENERATING THE SECOND SECTION OF CODE WITHOUT PERFORMING A COMPILER ANALYSIS OF THE ORIGINAL SEQUENTIAL LOOP 515

LOGIC FOR CREATING THE SECOND SECTION OF CODE IN A MANNER THAT ALLOWS THE TRANSACTIONS TO COMMIT IN AN ORDER THAT DOES NOT DEPEND ON AN EXECUTION ORDER OF THE ORIGINAL SEQUENTIAL LOOP IF THE ORIGINAL SEQUENTIAL LOOP IS DETERMINED TO BE IMMUNE TO REORDERING (USING HEURISTICS, USER-DEFINED ANNOTATION IN THE FIRST SECTION OF CODE, ETC.) 516

LOGIC FOR GENERATING THE SECOND SECTION OF CODE SO THAT AT LEAST SOME OF THE TRANSACTIONS ARE EXECUTED IN PARALLEL 517

LOGIC FOR EXECUTING THE SECOND SECTION OF CODE USING THE TRANSACTIONAL MEMORY SYSTEM, WITH AT LEAST SOME OF THE TRANSACTIONS EXECUTED ON DIFFERENT THREADS 518

OTHER LOGIC FOR OPERATING THE APPLICATION 520

FIG. 13

```
public class IterationWorkItem ⟵ 662
{ Delegate loopBody;
  Transaction transaction;
  ...
  void Run() {
    transaction.Execute( loopBody ); } }

Transaction previousTransaction = null;
foreach(Item i in collection) {  ⟵ 664
    Transaction currentTransaction = new Transaction( ...,
    IterationWorkItem iwi = new IterationWorkItem(
        delegate() { <statements> },  ⟵ 667
        previousTransaction );
    <Enqueue iwi for asynchronous execution>
    previousTransaction = currentTransaction;
}
<Wait till all work items have completed>
```

Parallel Loop — 660

FIG. 18B

```
int N = ...;
int[] incoming = ..., outgoing = ...;
while (P()) {                          ← 812
    int bufferToUse = rand(0..N);
    int data = incoming[bufferToUse].Get();
    outgoing[bufferToUse].Put();
}

Say that P() is bool P() { return true; }
```

Original Open Ended Sequential Loop

```
// shared among iterations
int currentIteration = 0;
int loopTerminated = 0;
TXCommitOrderContext ctx = ...; // to allow predecessor/successor relationship to be
established
...
while (!loopTerminated) {
    int myIteration = Interlocked.Increment(¤tIteration);
    TX tx(..., OrderedCommitContext, myIteration);
    if (!P()) {
        loopTerminated = 1;
        CommitAndAbortSuccessors();
        Break;
    }
    ... execute one (transacted) loop iteration as shown above ...
    ... Commit/Retry/Exception/Etc. gunk ...
}
```

Parallel Loop — 820

822 → while (!loopTerminated) {

FIG. 24B

PARALLELIZING SEQUENTIAL FRAMEWORKS USING TRANSACTIONS

CROSS-REFERENCE TO RELATED APPLICATIONS

This is a continuation-in-part application of application Ser. No. 11/601,541, filed Nov. 17, 2006, the specification of which is incorporated by reference herein in its entirety.

BACKGROUND

Software transactional memory (STM) is a concurrency control mechanism analogous to database transactions for controlling access to shared memory in concurrent computing. A transaction in the context of transactional memory is a piece of code that executes a series of reads and writes to shared memory. STM is used as an alternative to traditional locking mechanisms. Programmers put a declarative annotation (e.g. atomic) around a code block to indicate safety properties they require and the system automatically guarantees that this block executes atomically with respect to other protected code regions. The software transactional memory programming model prevents lock-based priority-inversion and deadlock problems.

While typical STM systems have many advantages, they still require the programmer to be careful in avoiding unintended memory access orderings. For example, the order in which transactions are committed (i.e. commit processing) in a typical STM environment is unconstrained. Transactions race with one another to commit, meaning that whether transaction 1 commits before transaction 2 or after is often a product of the dynamic scheduling of the program (and often by program-specific logic too). Moreover, if two transactions conflict, such as by trying to write to the same piece of memory, then their committing order can be arbitrarily decided based on one of many possible contention management policies. In both of these scenarios, no particular commit order is guaranteed; therefore the burden is on the programmer to make sure that his/her program works correctly with either order. This makes parallel programming very difficult.

One scenario in which order of execution may be important, and where parallelism may be very attractive, is when executing multiple iterations of a loop in parallel. Take a classic for . . . each loop, as shown below:

```
ForEach (string s in List<string>)
{
  S;
}
```

During each iteration of the loop, the statement S in the body of the loop will be executed. Such a loop was written to execute sequentially, with the first iteration of the loop finishing before the second one begins, and so on. If such a sequential loop is executed in parallel, without extra precautions to deal with possible side effects or order dependency, unexpected results could occur.

SUMMARY

Various technologies and techniques are disclosed for applying ordering to transactions in a transactional memory system. A transactional memory system is provided with a feature to allow a pre-determined commit order to be specified for a plurality of transactions. The pre-determined commit order is used at runtime to aid in determining an order in which to commit the transactions in the transactional memory system. In one implementation, the pre-determined commit order can be either total ordering or partial ordering. In the case of total ordering, the transactions are forced to commit in a linear order. In the case of partial ordering, the transactions are allowed to commit in one of multiple acceptable scenarios. In one implementation, a commit arbitrator keeps track of the next-to-commit value representing the transaction that should be allowed to commit next, and when a particular transaction is ready to commit, it is allowed to do so if its commit order number matches the next-to-commit value of the commit arbitrator.

A contention management process is invoked when a conflict occurs between a first transaction and a second transaction. The pre-determined commit order is used in the contention management process to aid in determining whether the first transaction or the second transaction should win the conflict and be allowed to proceed.

Techniques for transforming a sequential loop into a parallel loop for use with a transactional memory system are disclosed. A system based on transactional memory is provided. A first section of code containing an original sequential loop is transformed into a second section of code containing a parallel loop that uses transactions to preserve an original input to output mapping. For example, the original sequential loop can be transformed into a parallel loop by taking each iteration of the original sequential loop and generating a separate transaction that follows a pre-determined commit order process, and then assigning the transactions to different threads so they are executed in parallel. Should an unhandled exception be detected from within a particular transaction while the parallel loop is executing, state modifications made by that particular transaction and any predecessor transactions are committed, and state modifications made by any successor transactions are discarded. Otherwise, all transactions commit.

In one implementation, open ended and/or closed ended sequential loops can be transformed to parallel loops. For example, a section of code containing an original sequential loop is analyzed to determine a fixed number of iterations for the original sequential loop. The original sequential loop is transformed into a parallel loop that can generate transactions in an amount up to the fixed number of iterations. As another example, an open ended sequential loop can be transformed into a parallel loop that generates a separate transaction containing a respective work item for each iteration of a speculation pipeline. These transactions are assigned to different threads to allow at least part of the parallel loop to execute in parallel. The parallel loop is then executed under the protection of the transactional memory system with the benefits of pre-determined commit ordering.

In one implementation, a method for executing a parallel loop that was generated from an open ended sequential loop is provided. A speculation pipeline is generated that estimates a number of iterations to execute in a parallel loop, the parallel loop being generated from an open ended sequential loop. The system takes each iteration of the speculation pipeline and generates a separate transaction containing a respective work item. These separate transactions are then assigned to different threads, so that they end up being executed in parallel. A termination condition is evaluated for each respective work item. When a particular one of the respective work items determines that a time to terminate the parallel loop has arrived, predecessors are committed and successors are discarded.

This Summary was provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIG. 13 is a diagrammatic view of a transactional memory application of one implementation operating on the computer system of FIG. 1.

FIGS. 18A-18B illustrate hypothetical source code for an exemplary transformation from an original sequential loop into a parallel loop.

FIGS. 24A-24B illustrate hypothetical source code for an exemplary transformation from an original open ended sequential loop into a parallel loop.

DETAILED DESCRIPTION

Figure 1:
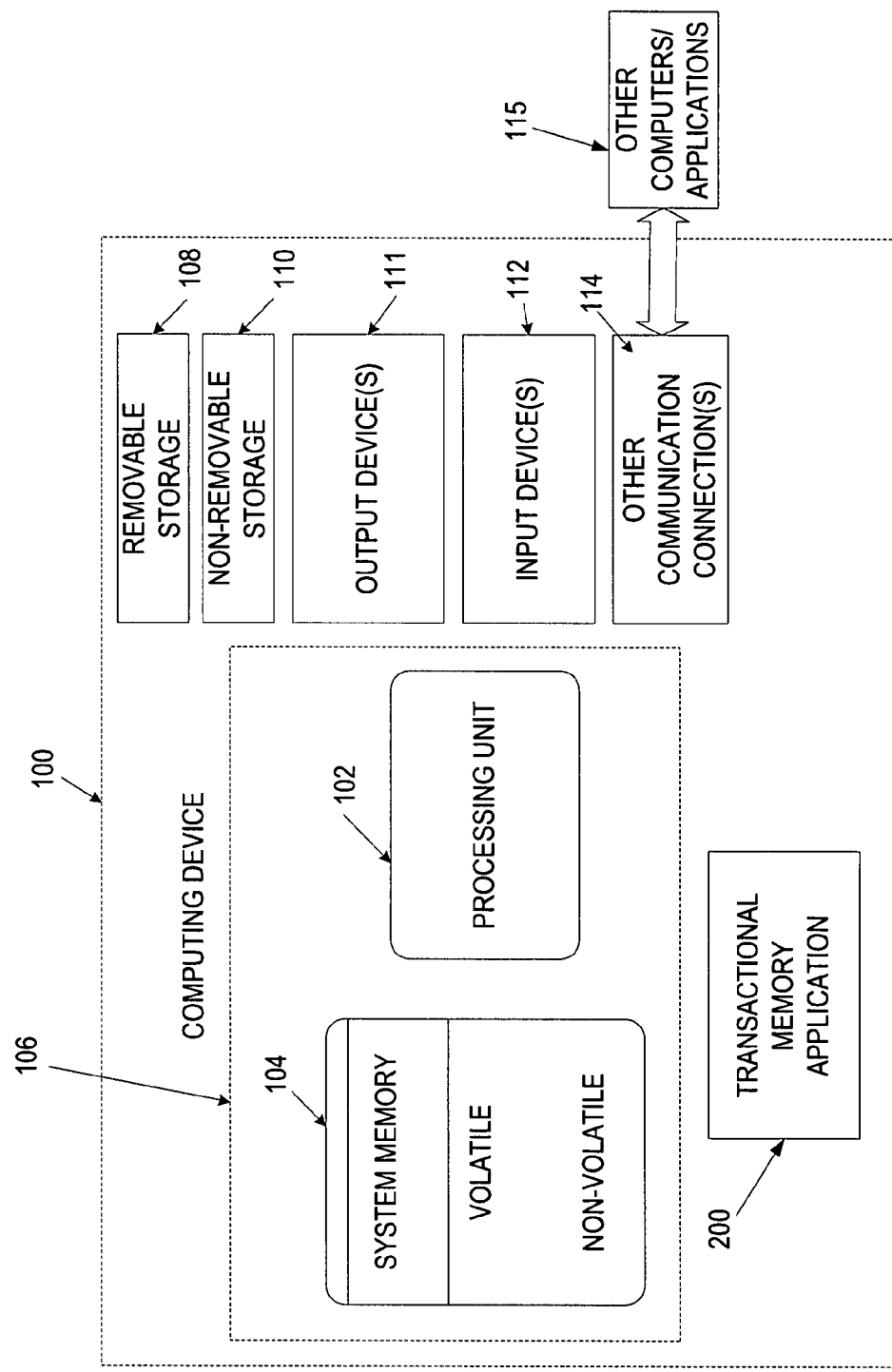
FIG. 1 is a diagrammatic view of a computer system of one implementation.

For the purposes of promoting an understanding of the principles of the invention, reference will now be made to the embodiments illustrated in the drawings and specific language will be used to describe the same. It will nevertheless be understood that no limitation of the scope is thereby intended. Any alterations and further modifications in the described embodiments, and any further applications of the principles as described herein are contemplated as would normally occur to one skilled in the art.

The system may be described in the general context as a transactional memory system, but the system also serves other purposes in addition to these. In one implementation, one or more of the techniques described herein can be implemented as features within a framework program such as MICROSOFT® .NET Framework, or from any other type of program or service that provides platforms for developers to develop software applications. In another implementation, one or more of the techniques described herein are implemented as features with other applications that deal with developing applications that execute in concurrent environments.

In one implementation, a feature is provided in the transactional memory system to allow a pre-determined commit order to be specified for a plurality of transactions. The pre-determined commit order is used to aid in determining an order in which to commit the transactions. In one implementation, a contention management process is invoked when a conflict occurs between a first transaction and a second transaction. The pre-determined commit order is then used in the contention management process to aid in determining whether the first transaction or the second transaction should win the conflict and be allowed to proceed.

In another implementation, a feature is provided in the transactional memory system to convert an original sequential loop into a parallel loop. The original sequential loop is converted into a parallel loop in a manner that ensures the original input to output mapping is preserved. The term "original input to output mapping is preserved" as used herein means that a state of the program after the execution of the parallelized loop is the same as if the sequential loop had been run instead. In one implementation, the original input to output mapping is preserved in the parallel loop by placing each iteration of the original sequential loop into a transaction, and then using the pre-determined commit order process described herein to ensure the transactions commit in the proper order.

While many of the examples discussed herein are described in the context of a software transactional memory system, it will be appreciated that in other implementations, some, all, or additional features and/or techniques than discussed herein could be implemented with a hardware transactional memory system either separately or in conjunction with a software transactional memory system.

As shown in FIG. 1, an exemplary computer system to use for implementing one or more parts of the system includes a computing device, such as computing device 100. In its most basic configuration, computing device 100 typically includes at least one processing unit 102 and memory 104. Depending on the exact configuration and type of computing device, memory 104 may be volatile (such as RAM), non-volatile (such as ROM, flash memory, etc.) or some combination of the two. This most basic configuration is illustrated in FIG. 1 by dashed line 106.

Additionally, device 100 may also have additional features/functionality. For example, device 100 may also include additional storage (removable and/or non-removable) including, but not limited to, magnetic or optical disks or tape. Such additional storage is illustrated in FIG. 1 by removable storage 108 and non-removable storage 110. Computer storage media includes volatile and nonvolatile, removable and non-removable media implemented in any method or technology for storage of information such as computer readable instructions, data structures, program modules or other data. Memory 104, removable storage 108 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by device 100. Any such computer storage media may be part of device 100.

Computing device 100 includes one or more communication connections 114 that allow computing device 100 to communicate with other computers/applications 115. Device 100 may also have input device(s) 112 such as keyboard, mouse, pen, voice input device, touch input device, etc. Output device(s) 111 such as a display, speakers, printer, etc. may also be included. These devices are well known in the art and need not be discussed at length here. In one implementation, computing device 100 includes transactional memory application 200. Transactional memory application 200 will be described in further detail in FIG. 2.

Figure 2:
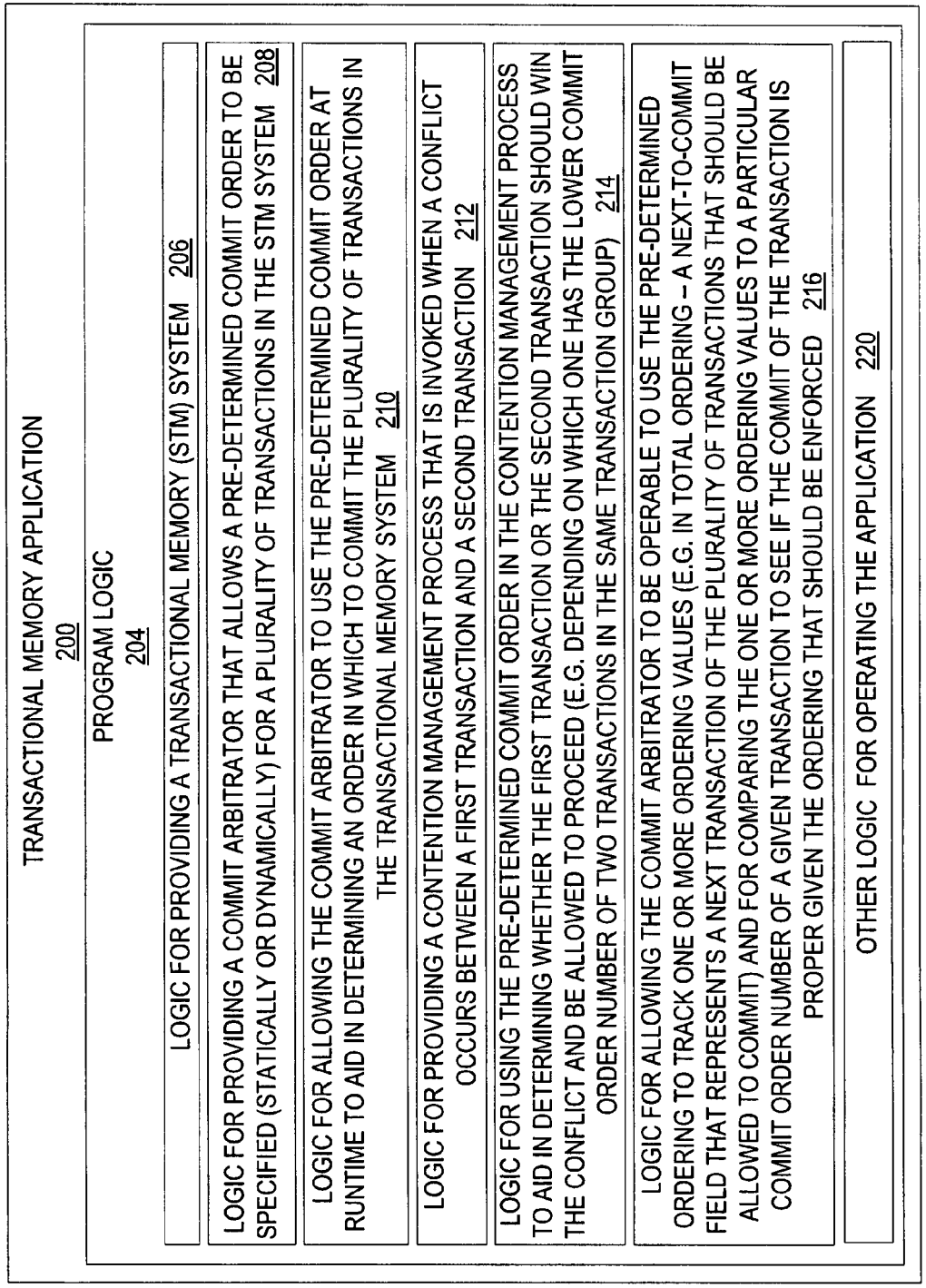
FIG. 2 is a diagrammatic view of a transactional memory application of one implementation operating on the computer system of FIG. 1.

Turning now to FIG. 2 with continued reference to FIG. 1, a transactional memory application 200 operating on computing device 100 is illustrated. Transactional memory application 200 is one of the application programs that reside on computing device 100. However, it will be understood that transactional memory application 200 can alternatively or additionally be embodied as computer-executable instructions on one or more computers and/or in different variations than shown on FIG. 1. Alternatively or additionally, one or more parts of transactional memory application 200 can be part of system memory 104, on other computers and/or applications 115, or other such variations as would occur to one in the computer software art.

Transactional memory application 200 includes program logic 204, which is responsible for carrying out some or all of the techniques described herein. Program logic 204 includes logic for providing a transactional memory (STM) system 206; logic for providing a commit arbitrator that allows a pre-determined commit order to be specified, statically or dynamically, for a plurality of transactions in the STM system 208; logic for allowing the commit arbitrator to use the pre-determined commit order at runtime to aid in determining an order in which to commit the plurality of transactions in the transactional memory system 210; logic for providing a contention management process that is invoked when a conflict occurs between a first transaction and a second transaction 212; logic for using the pre-determined commit order in the contention management process to aid in determining whether the first transaction or the second transaction should win the conflict and be allowed to proceed (e.g. depending on which one has the lower commit order number of two transaction in the same transaction group) 214; logic for allowing the commit arbitrator to be operable to use the pre-determined commit ordering to track one or more ordering values (e.g. in total ordering—a next-to-commit field that represents a next transaction of the plurality of transaction that should be allowed to commit) and for comparing the one or more ordering values to a particular commit order number of a given transaction to see if the commit of the given transaction is proper given the ordering that should be enforced) 216; and other logic for operating the application 220. In one implementation, program logic 204 is operable to be called programmatically from another program, such as using a single call to a procedure in program logic 204.

Figure 3:
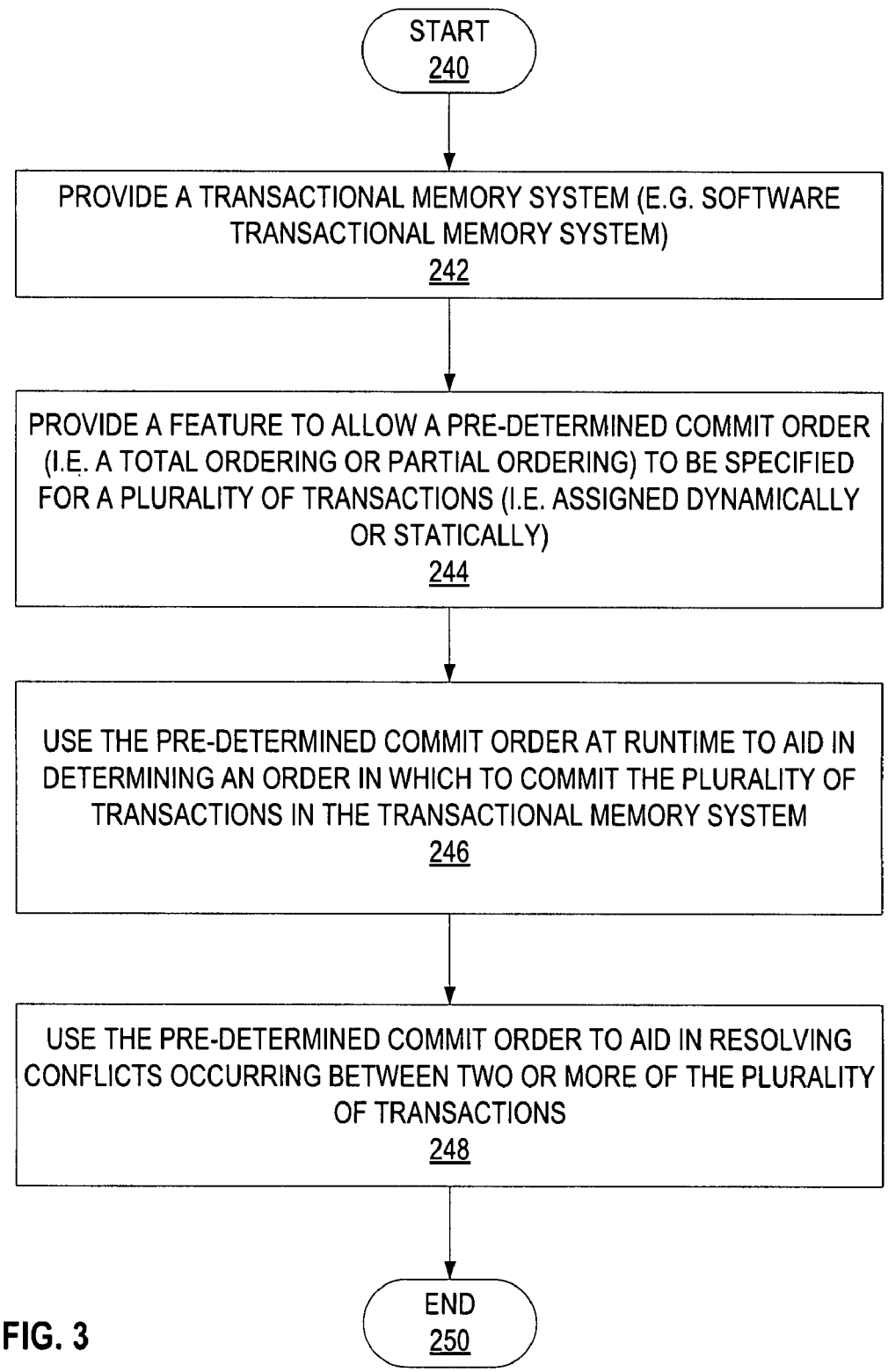
FIG. 3 is a high-level process flow diagram for one implementation of the system of FIG. 1.

Turning now to FIGS. 3-10 with continued reference to FIGS. 1-2, the stages for implementing one or more implementations of transactional memory application 200 are described in further detail. FIG. 3 is a high level process flow diagram for transactional memory application 200. In one form, the process of FIG. 3 is at least partially implemented in the operating logic of computing device 100. The procedure begins at start point 240 with providing a transactional memory system (e.g. a software transactional memory system) (stage 242). A feature is provided to allow a pre-determined commit order (e.g. a total ordering or partial ordering) to be specified for a plurality of transactions (e.g. assigned dynamically or statically) (stage 244). The term "pre-determined commit order" as used herein is meant to include a specific order in which a particular group of related transactions should be committed, as determined at any point in time before the transactions start running. The term "group" of transactions as used herein includes a particular set of (e.g. plurality of) transactions managed by the same commit arbitrator, as well as nested children of those transactions.

The pre-determined commit order is used at runtime to aid in determining an order in which to commit the plurality of transactions in the transactional memory system (stage 246). The pre-determined commit order is used to aid in resolving conflicts occurring between two or more of the plurality of transactions (stage 248). The process ends at end point 250.

Figure 4:
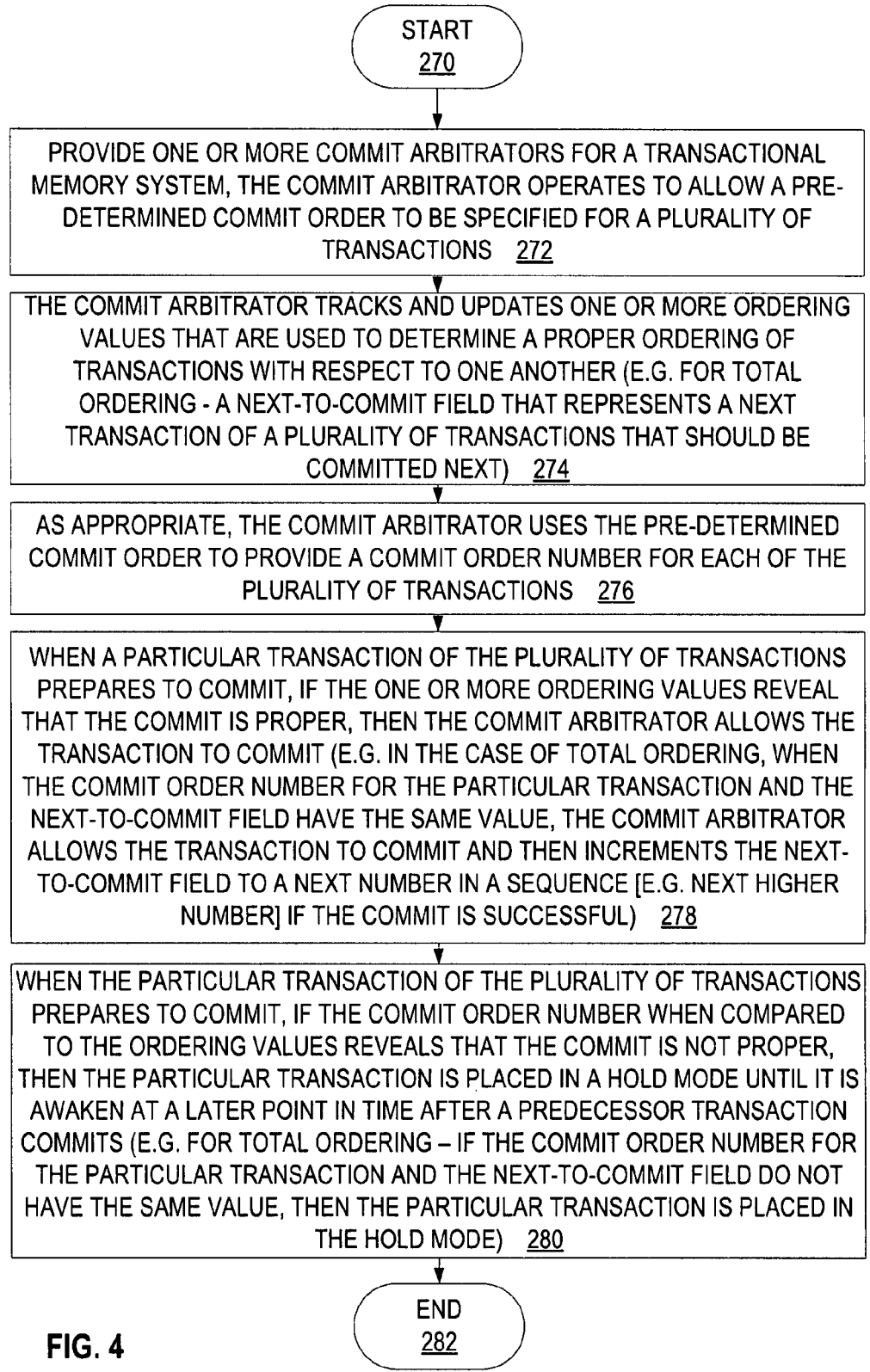
FIG. 4 is a process flow diagram for one implementation of the system of FIG. 1 illustrating the stages involved in using a commit arbitrator to enforce a pre-determined commit order.

FIG. 4 illustrates one implementation of the stages involved in using a commit arbitrator to enforce a pre-determined commit order. In one form, the process of FIG. 4 is at least partially implemented in the operating logic of computing device 100. The procedure begins at start point 270 with providing one or more commit arbitrators for a transaction memory system, the commit arbitrator being operable to allow a pre-determined commit order to be specified for a plurality of transactions (stage 272). The term "commit arbitrator" as used herein is meant to include any type of program, feature, or process that is responsible for managing one or more groups of transactions that should be ordered with respect to one another. In one implementation, there can be one or more commit arbitrators active within a program at any given time. For example, as many commit arbitrators as are needed can be created to manage the different groups of transactions. The commit arbitrator tracks and updates one or more ordering values that are used to determine the proper ordering of transactions with respect to one another (stage 274). In the case of total ordering, a next-to-commit field can be used to represent a next transaction of a plurality of transactions that should be committed next) (stage 274). In the case of partial ordering, a directed graph of different possible orders is tracked using the ordering values. As appropriate, the commit arbitrator uses the pre-determined commit order to provide a commit order number for each of the plurality of transactions (stage 276).

When a particular transaction of the plurality of transactions prepares to commit, if the commit order number for the particular transaction when compared to the one or more ordering values reveals that the commit is proper, then the commit arbitrator allows the transaction to commit (stage 278). In the case of total ordering, this scenario occurs when the next-to-commit field and the commit order number for the particular transaction have the same value. In such a scenario, the commit arbitrator allows the transaction to commit and then increments the next-to-commit field to a next number in a sequence (e.g. next higher number) if the commit is successful (stage 278). When the particular transaction of the plurality of transactions prepares to commit, if the commit order number for the particular transaction when compared to the ordering values reveals that the commit is not proper, then the particular transaction is placed in a hold mode until it is awakened at a later point in time after a predecessor transaction commits (stage 280). In the case of total ordering, this hold mode is entered when the next-to-commit field and the order number for the particular transaction do not have the same value.

In one implementation, the system may wake a transaction after its immediate predecessor has committed, in which case it may try to commit right away. Alternatively, the system may choose to wake a transaction after some non-immediate predecessor has committed, even though its immediate predecessor may not yet have committed. After being awakened, the system checks to see if it is appropriate for the transaction to really commit. If so, the transaction is committed. The process ends at end point 282.

Figure 5:
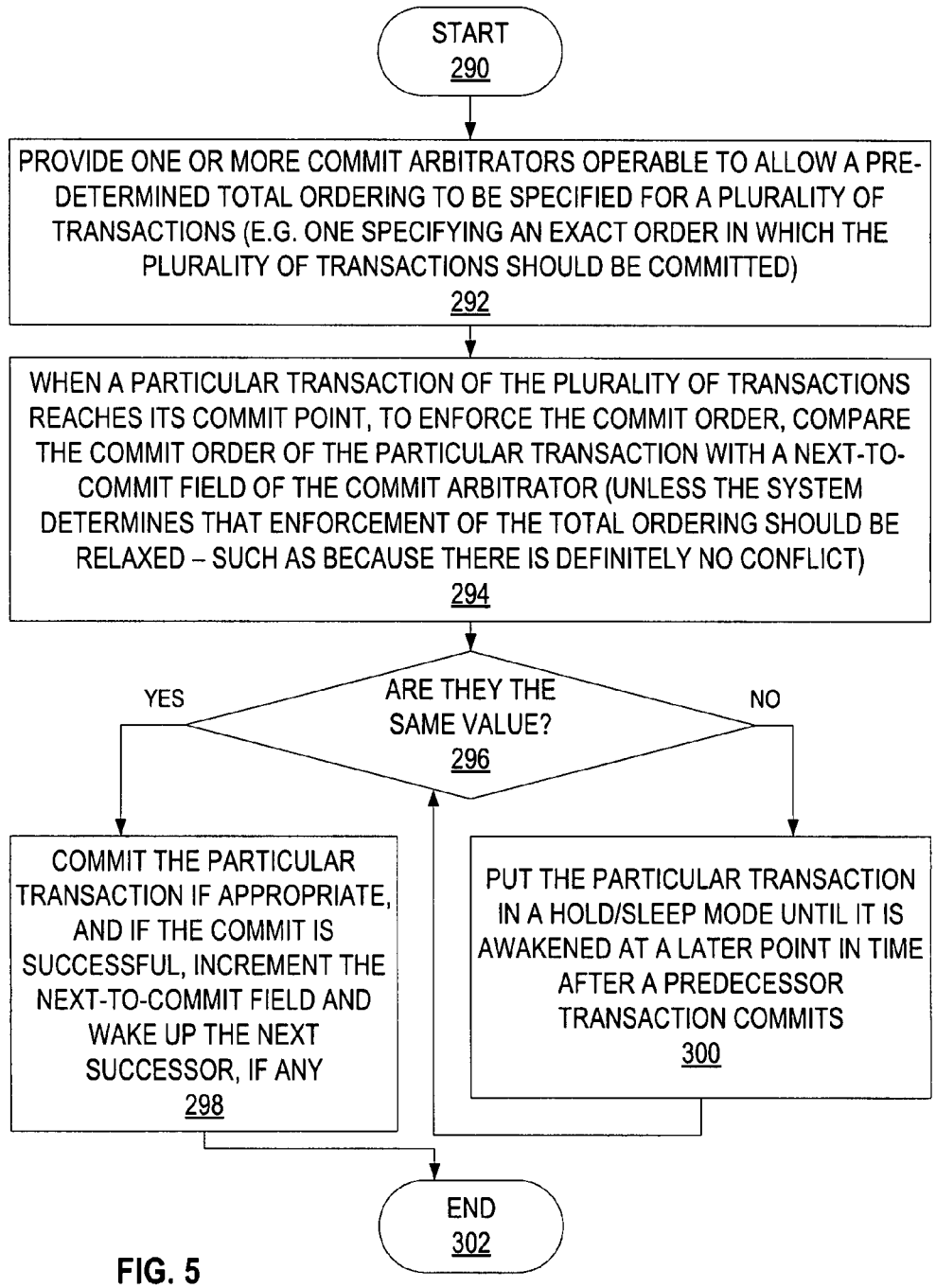
FIG. 5 is a process flow diagram for one implementation of the system of FIG. 1 illustrating the stages involved in using a commit arbitrator to enforce a total ordering of a plurality of transactions.

FIG. 5 illustrates one implementation of the stages involved in using a commit arbitrator to enforce a total ordering of a plurality of transactions. In one form, the process of FIG. 5 is at least partially implemented in the operating logic of computing device 100. The procedure begins at start point 290 with providing one or more commit arbitrators operable to allow a pre-determined total ordering to be specified for a plurality of transactions (e.g. one specifying an exact order in which the plurality of transactions should be committed) (stage 292). When a particular transaction of the plurality of transactions reaches its commit point, to enforce the commit order, the commit order of the particular transaction is compared with a next-to-commit field of the commit arbitrator (stage 296). In one implementation, if the system determines that enforcement of the total ordering is not necessary (e.g. such as because there is definitely no conflict), then the total ordering requirement can be broken as appropriate (stage 294), then the process ends at end point 302.

If commit ordering is to be enforced, and if the commit order of the particular transaction has a same value as the next-to-commit field of the commit arbitrator (decision point 296), then the particular transaction is committed, and if the commit is successful, the next-to-commit field is incremented and the next successor is awakened, if any exist (stage 298). If the commit order of the particular transaction does not have the same value as the next-to-commit field of the commit arbitrator (decision point 296), then the particular transaction is put in a hold/sleep mode until it is awakened at a later point in time after a predecessor transaction commits (stage 300). In one implementation, at that later point in time, if a conflict occurs with a predecessor, that particular transaction may be asked to abort and rollback such that a predecessor may make forward progress. Otherwise, if no such conflict has occurred, that particular transaction should be able to commit once the commit order requirements described herein are met. The process then ends at end point 302.

Figure 6:
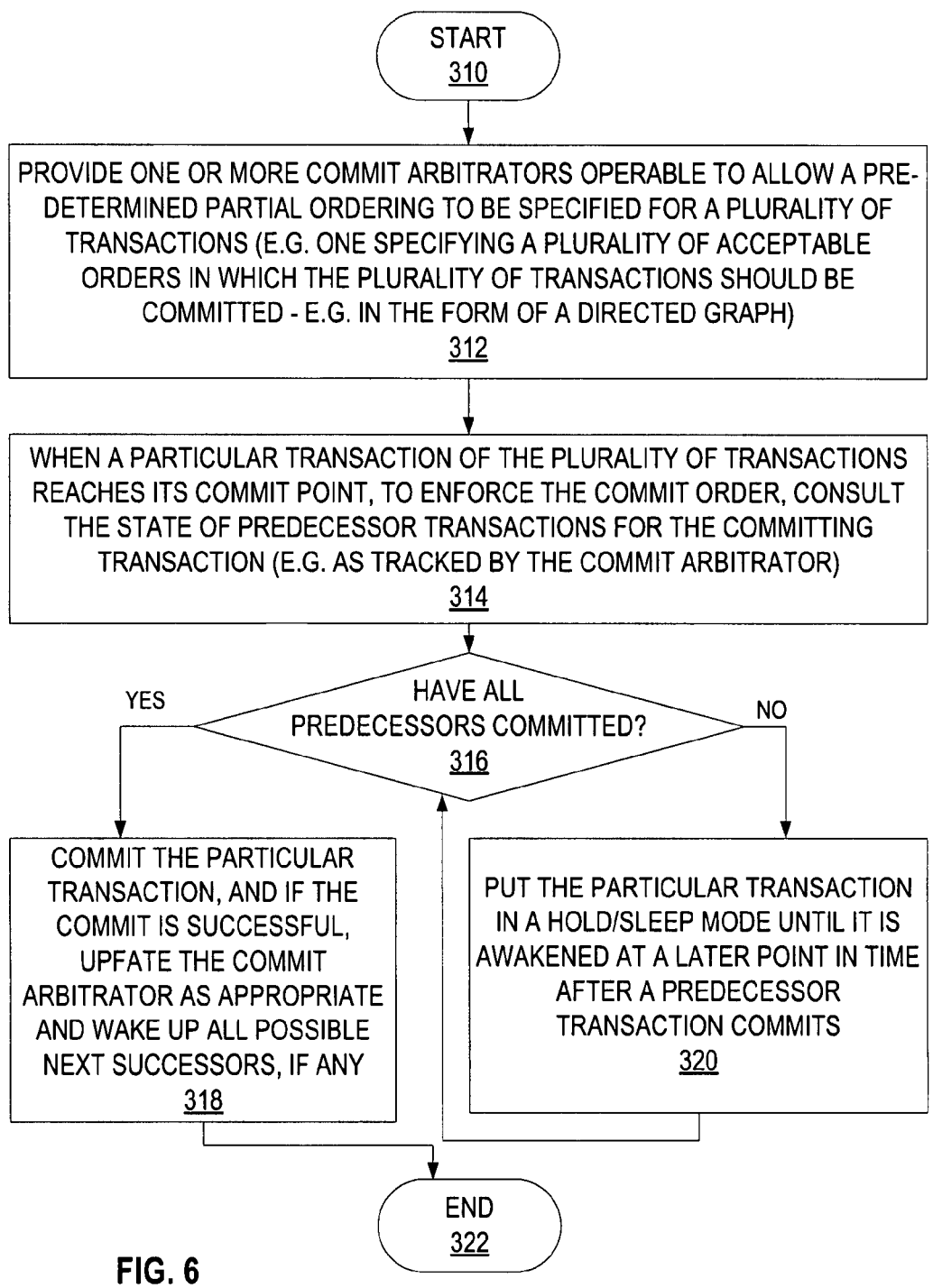
FIG. 6 is a process flow diagram for one implementation of the system of FIG. 1 illustrating the stages involved in using a commit arbitrator to enforce a partial ordering of a plurality of transactions.

FIG. 6 illustrates one implementation of the stages involved in using a commit arbitrator to enforce a partial ordering of a plurality of transactions. In one form, the process of FIG. 6 is at least partially implemented in the operating logic of computing device 100. The procedure begins at start point 310 with providing one or more commit arbitrators operable to allow a pre-determined partial ordering to be specified for a plurality of transactions (e.g. one specifying a plurality of acceptable orders in which the plurality of transactions should be committed—e.g. in the form of a directed graph) (stage 312). When a particular transaction of the plurality of transactions reaches its commit point, to enforce the commit order, the state of the predecessor transactions (e.g. one or more ordering values) are consulted for the particular committing transaction (e.g. as tracked by the commit arbitrator) (stage 314). If all predecessors to the particular transaction have committed (decision point 316), then the particular transaction is committed (stage 318). If the commit is successful, one or more values tracked by the commit arbitrator are updated as appropriate, and all possible next successors are awakened, if any exist (stage 318).

If all predecessors to the particular transaction have not committed (decision point 316), then the particular transaction is put in a hold/sleep mode until it is awakened at a later point in time after a predecessor transaction commits (stage 320). The process ends at end point 322.

Figure 7:
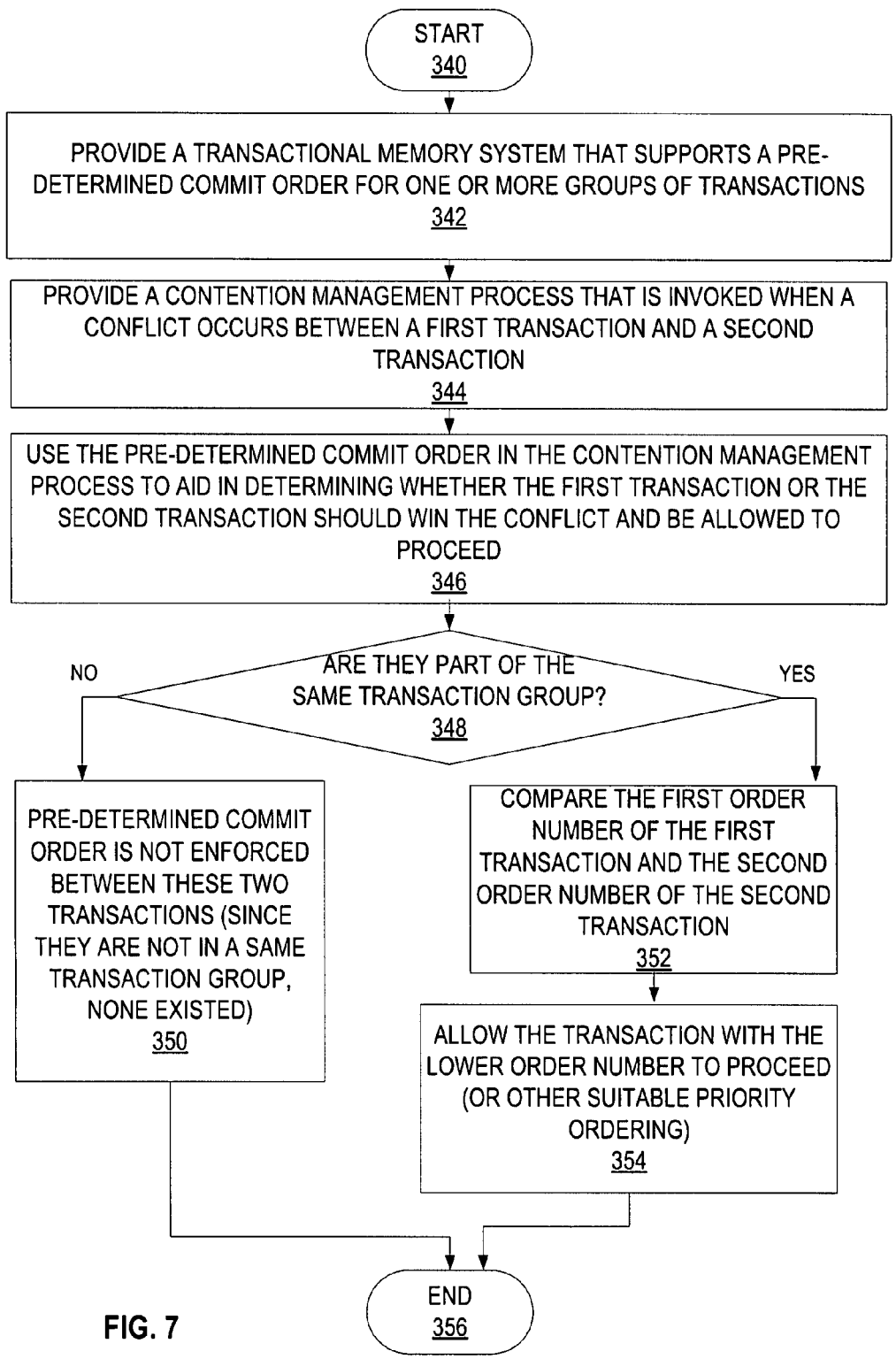
FIG. 7 is a process flow for one implementation of the system of FIG. 1 that illustrates the stages involved in providing a contention management process that manages conflicts using the pre-determined commit order information.

FIG. 7 illustrates one implementation of the stages involved in providing a contention management process that manages conflicts using the pre-determined commit order information. In one form, the process of FIG. 7 is at least partially implemented in the operating logic of computing device 100. The procedure begins at start point 340 with providing a transactional memory system that supports a pre-determined commit order for one or more groups of transactions (stage 342). A contention management process is provided that is invoked when a conflict occurs between a first transaction and a second transaction (stage 344). The pre-determined commit order is used in the contention management process to aid in determining whether the first transaction or the second transaction should win the conflict and be allowed to proceed (stage 346). If the first transaction and second transaction are not part of the same transaction group (decision point 348), then a pre-determined commit order is not enforced between these two transactions (because none existed) (stage 350). In such a scenario, since the two transactions are not in a same transaction group, the ordering factor is not used to help resolve the conflict (stage 350).

If the first transaction and the second transaction are part of the same transaction group (decision point 348), then the system compares the first order number of the first transaction and the second order number of the second transaction (stage 352). The transaction with the lower order number is allowed to proceed (or with another suitable priority ordering) (stage 354). The process ends at end point 356.

Figure 8:
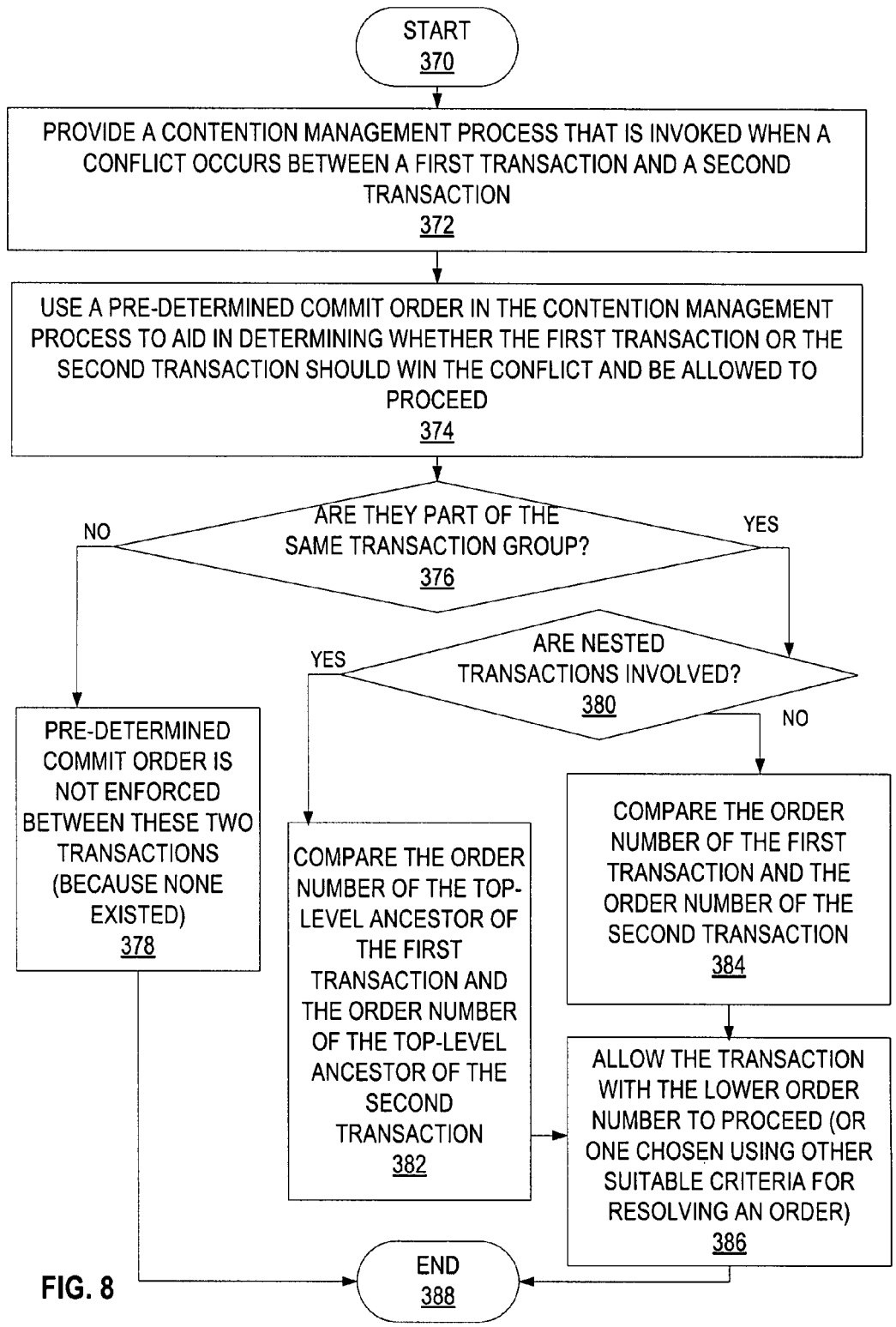
FIG. 8 is a process flow for one implementation of the system of FIG. 1 that illustrates the stages involved in providing a contention management process that manages conflicts with nested transactions using the pre-determined commit order information.

FIG. 8 illustrates one implementation of the stages involved in providing a contention management process that manages conflicts with nested transactions using the pre-determined commit order information. In one form, the process of FIG. 8 is at least partially implemented in the operating logic of computing device 100. In one implementation, the entire ancestor chain is considered for each transaction before committing the particular transaction, so that any ordering present in that chain is enforced. The procedure begins at start point 370 with providing a contention management process that is invoked when a conflict occurs between a first transaction and a second transaction (stage 372). A pre-determined commit order is used in the contention management process to aid in determining whether the first transaction or the second transaction should win the conflict and be allowed to proceed (stage 372). If the first and second transactions are not part of the same transaction group (decision point 376), then a pre-determined commit order is not enforced between those two transactions (because none existed) (stage 378) and the process ends at end point 388. If the first and second transactions are part of the same transaction group (decision point 376), then the system checks to see if nested transactions are involved (decision point 380).

If nested transactions are not involved (decision point 380), then the order number (or other ordering indicator) of the first transaction is compared with the order number (or other ordering indicator) of the second transaction (stage 384). The transaction with the lower order number is allowed to proceed (or the one determined to be next in order by using other suitable ordering criteria) (stage 386).

If nested transactions are involved (decision point 380), then the order number (or other ordering indicator) of the top level ancestor of the first transaction is compared with the order number (or other ordering indicator) of the top level ancestor of the second transaction (stage 382). The term "top level ancestor" as used herein is meant to include the immediate children of common ancestors where common ancestors are involved, and the top level ancestor of each transaction where there is no common ancestor involved. These scenarios involving common and uncommon ancestors are illustrated in further detail in FIGS. 9 and 10. The transaction with the lower order number is allowed to proceed (e.g. the transaction related to the ancestor that had the lower order number or other suitable criteria) (stage 386). The process ends at end point 388.

Figure 9:
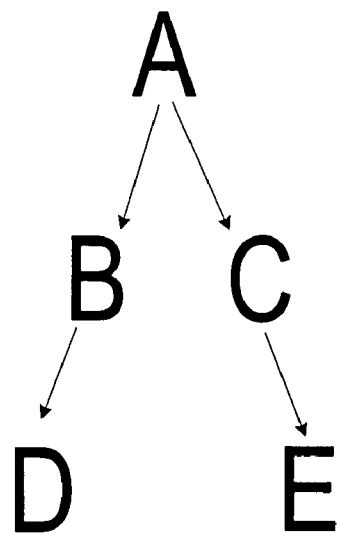
FIG. 9 is a logical diagram illustrating an exemplary ancestor tree with top level ancestors that have a common ancestor.

FIG. 9 is a logical diagram illustrating an exemplary ancestor tree with top level ancestors that have a common ancestor. In the example shown, transaction A is a common ancestor of D and E. In conflicts occurring between D and E, the order number of transactions B and C (the immediate children of common ancestor A) are analyzed to determine which transaction D or E should be allowed to proceed (stage 382 in FIG. 8).

Figure 10:
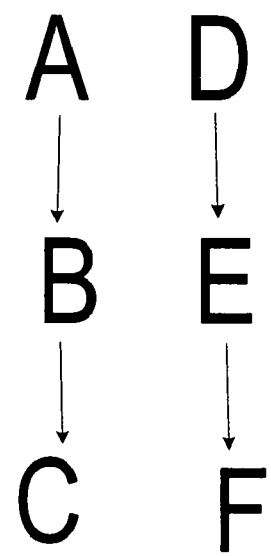
FIG. 10 is a logical diagram illustrating an exemplary ancestor tree with top level ancestors that do not have a common ancestor.

FIG. 10 is a logical diagram illustrating an exemplary ancestor tree with top level ancestors that do not have common ancestors. In the example shown, transaction A is an ancestor of transaction C. Transaction D is an ancestor of transaction F. In conflicts occurring between transactions C and F, then the order number of transactions A and D (the top level ancestor of each) are compared to determine which transaction C or F should be allowed to proceed (stage 382 in FIG. 8).

Figure 11:
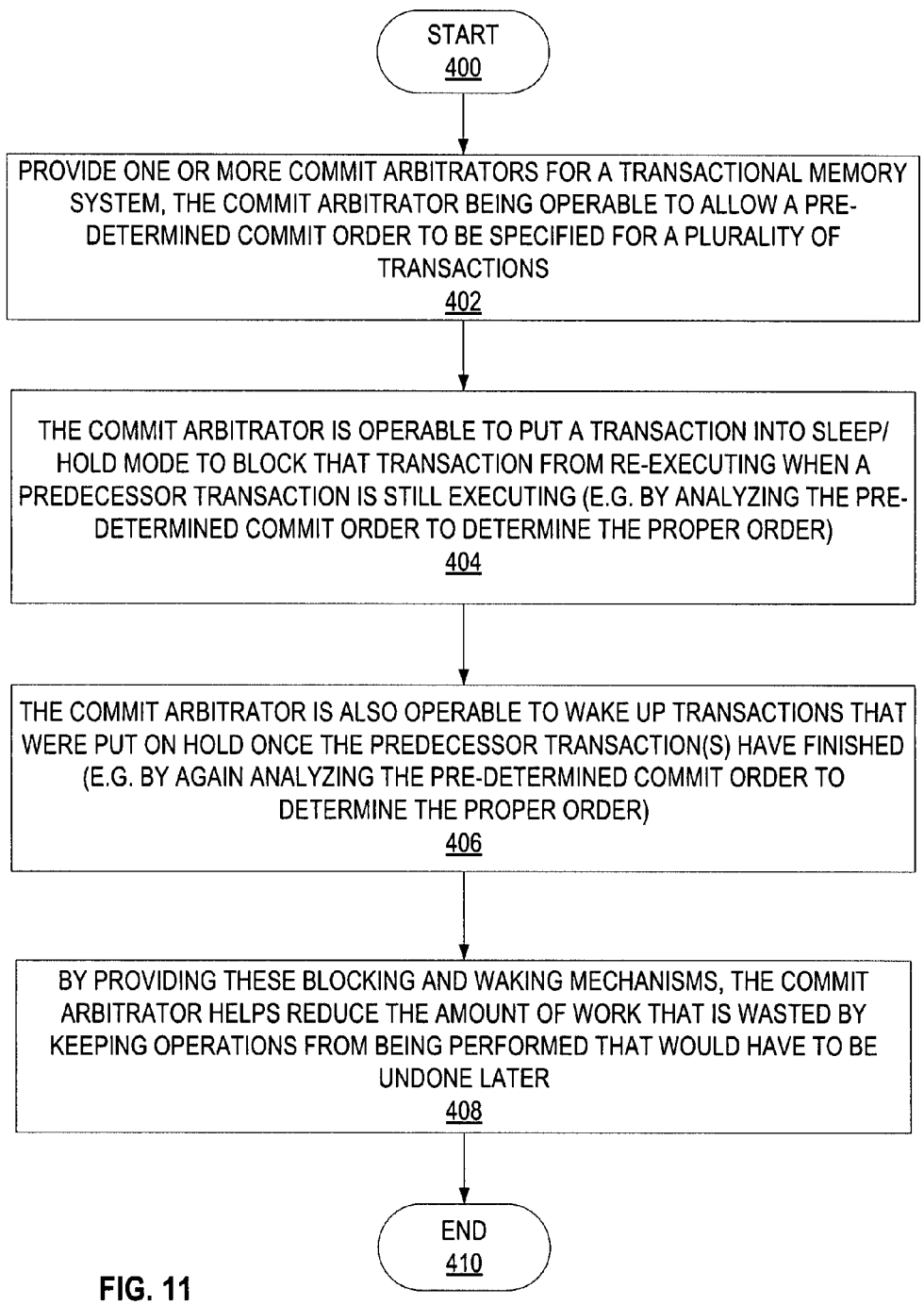
FIG. 11 is a process flow diagram for one implementation of the system of FIG. 1 that illustrates the stages involved in reducing an amount of wasted work by using a commit arbitrator in a transactional memory system.

FIG. 11 illustrates one implementation of the stages involved in reducing the amount of wasted work by using a commit arbitrator in a transactional memory system. In one form, the process of FIG. 11 is at least partially implemented in the operating logic of computing device 100. The procedure begins at start point 400 with providing one or more commit arbitrators for a transactional memory system, the commit arbitrator being operable to allow a pre-determined commit order to be specified for a plurality of transactions (stage 402). The commit arbitrator is operable to put a transaction into sleep/hold mode to block that transaction from re-executing when a predecessor transaction is still executing (e.g. by analyzing the pre-determined commit order to determine the proper order (stage 404). The commit arbitrator is also operable to wake up transactions that were put on hold once the predecessor transaction(s) have finished (e.g. by again analyzing the pre-determined commit order to determine the proper order) (stage 406). By providing these blocking and waking mechanisms, the commit arbitrator helps reduce the amount of work that is wasted by keeping operations from being performed that would have to be undone later (stage 408). The process ends at end point 410.

Figure 12:
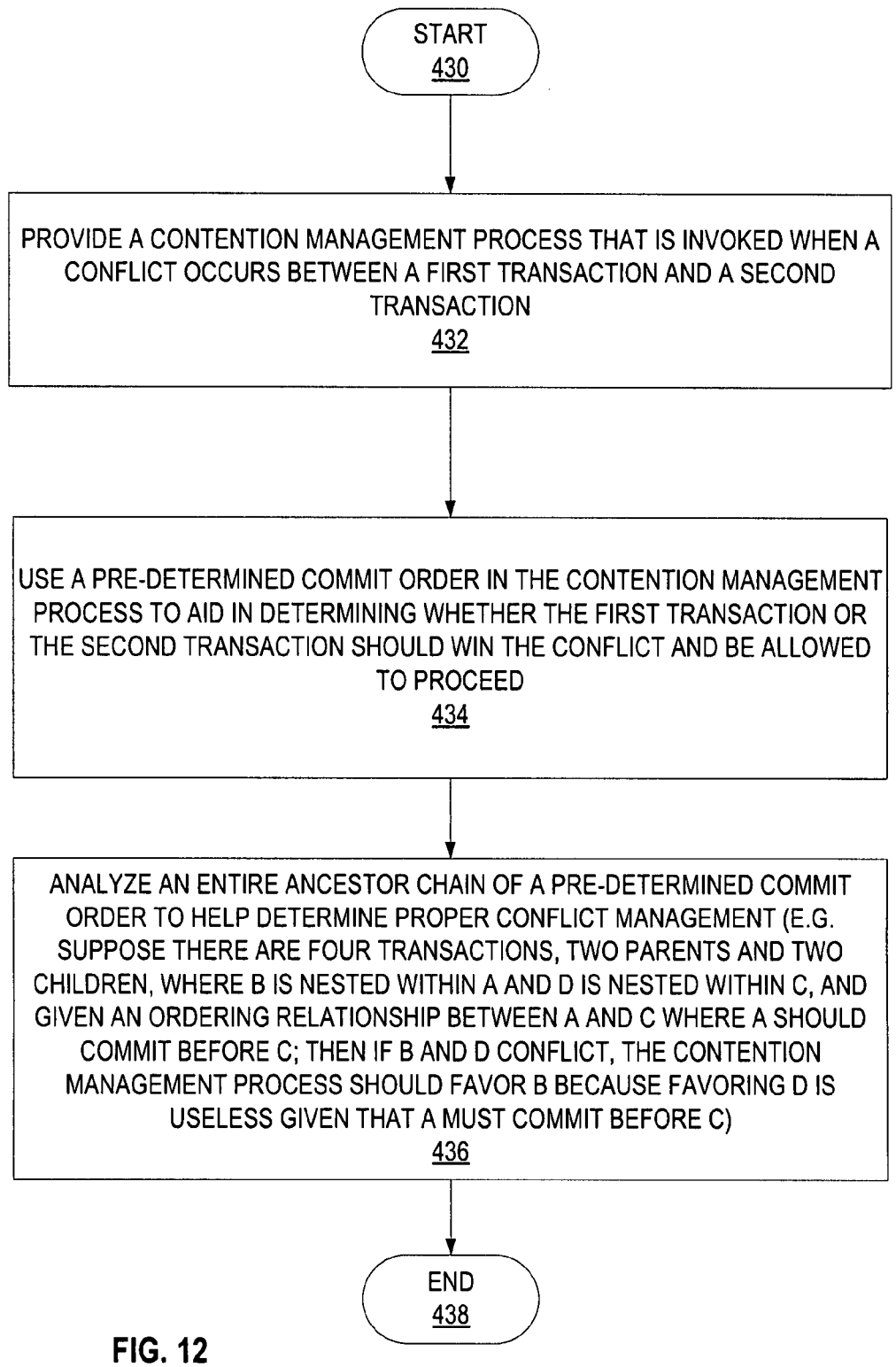
FIG. 12 is a process flow diagram for one implementation of the system of FIG. 1 that illustrates the stages involved in analyzing an entire ancestor chain in a contention management process to determine the proper conflict resolution.

FIG. 12 illustrates one implementation of the stages involved in analyzing an entire ancestor chain in a contention management process to determine the proper conflict resolution. In one form, the process of FIG. 12 is at least partially implemented in the operating logic of computing device 100. The procedure begins at start point 430 with providing a contention management process that is invoked when a conflict occurs between a first transaction and a second transaction (stage 432). A pre-determined commit order is used in the contention management process to aid in determining whether the first transaction or the second transaction should win the conflict and be allowed to proceed (stage 434). An entire ancestor chain of a pre-determined commit order is analyzed to help determine the proper conflict management (stage 436). For example, if there are four transactions, two parents and two children, where B is nested within A and D is nested within C. Suppose there is an ordering relationship between A and C where A should commit before C. If B and D conflict, the contention management process should favor B because favoring D is useless given that A must commit before C. (stage 436). The process ends at end point 438.

Turning now to FIG. 13 with continued reference to FIG. 1, a transactional memory application with parallel loop support 500 operating on computing device 100 is illustrated. In one implementation, transactional memory application with parallel loop support 500 is one of the application programs that reside on computing device 100. However, it will be understood that transactional memory application with parallel loop support 500 can alternatively or additionally be embodied as computer-executable instructions on one or more computers and/or in different variations than shown on FIG. 1. Alternatively or additionally, one or more parts of transactional memory application with parallel loop support 500 can be part of system memory 104, on other computers and/or applications 115, or other such variations as would occur to one in the computer software art.

Transactional memory application with parallel loop support 500 includes program logic 504, which is responsible for carrying out some or all of the techniques described herein. Program logic 504 includes logic for providing a transactional memory system 506; logic for transforming a first section of code containing an original sequential loop into a second section of code containing a parallel loop that uses transactions to preserve an original input to output mapping and improve safety 508; logic for placing one or more of the iterations of the original sequential loop into a separate one of the transactions in the parallel loop 510; logic for preserving an original input to output mapping by committing the transactions using a pre-determined commit order that is consistent with an execution order of the original sequential loop 512; logic for using a commit arbitrator to detect and handle conflicts in the parallel loop if the original sequential loop contains operations that modify data 514; logic for generating the second section of code without performing a compiler analysis of the original sequential loop 515; logic for creating the second section of code in a manner that allows the transactions to commit in an order that does not depend on an execution order of the original sequential loop if the original sequential loop is determined to be immune to reordering (using heuristics, user-defined annotation in the first section of code, etc.) 516; logic for generating the second section of code so that at least some of the transactions are executed in parallel 517; logic for executing the second section of code using the transactional memory system, with at least some of the separate transactions being executed on different threads 518; and other logic for operating the application 520. In one implementation, program logic 504 is operable to be called programmatically from another program, such as using a single call to a procedure in program logic 504.

Figure 14:
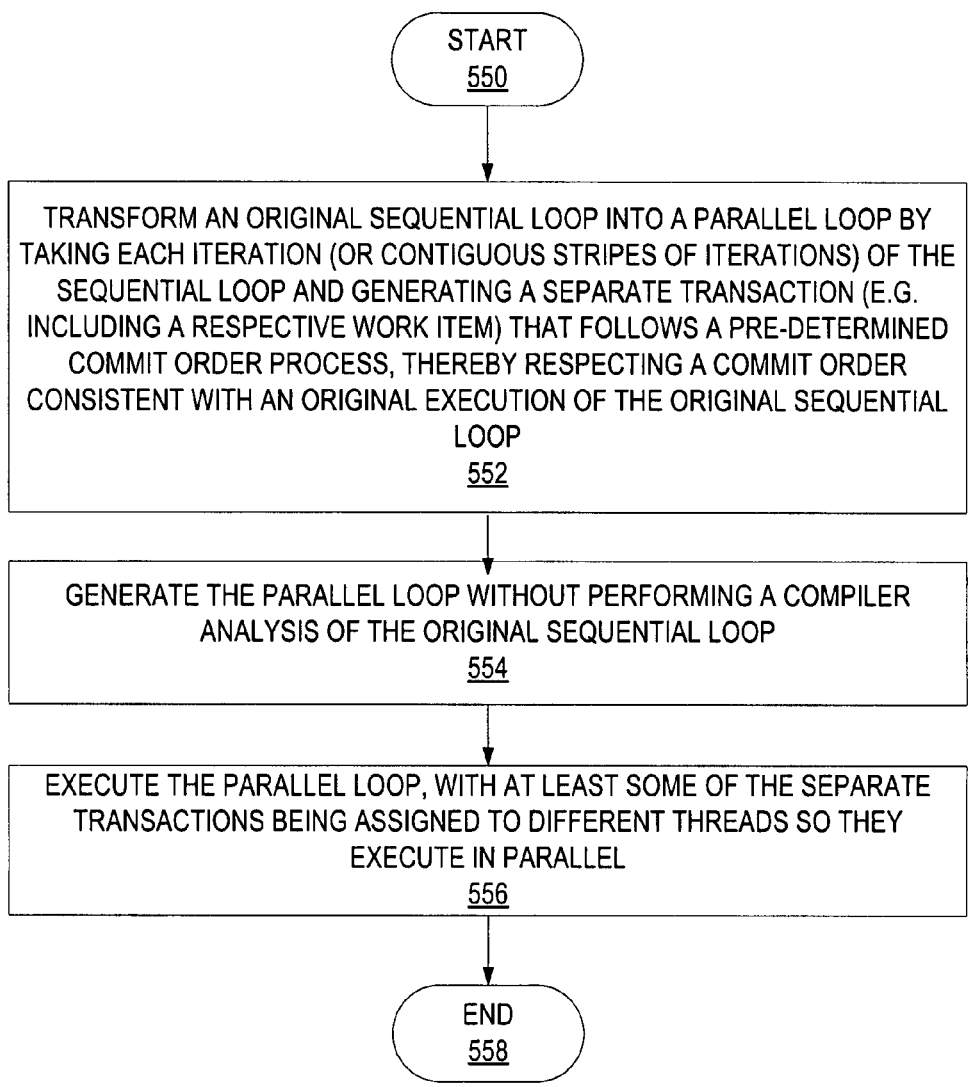
FIG. 14 is a process flow diagram for one implementation of the system of FIG. 1 illustrating the stages involved in transforming an original sequential loop into a parallel loop.

Turning now to FIG. 14, one implementation of the high level stages involved in transforming an original sequential loop into a parallel loop is illustrated. In one form, the process of FIG. 14 is at least partially implemented in the operating logic of computing device 100. The process begins at start point 550 with transforming an original sequential loop into a parallel loop by taking each iteration of the sequential loop and generating a separate transaction (e.g. including a respective work item) that follows a pre-determined commit order process, thereby respecting a commit order consistent with an original execution of the original sequential loop (stage 552). In another implementation, contiguous stripes of iterations (e.g. adjacent ones) can be grouped together into a transaction, in the case that creating one transaction per iteration is deemed too costly (stage 552). The system generates the parallel loop without performing a compiler analysis of the original sequential loop (stage 554). The parallel loop is then executed, with at least some of the separate transactions being assigned to different threads so they execute in parallel (stage 556). The process ends at end point 558.

Figure 15:
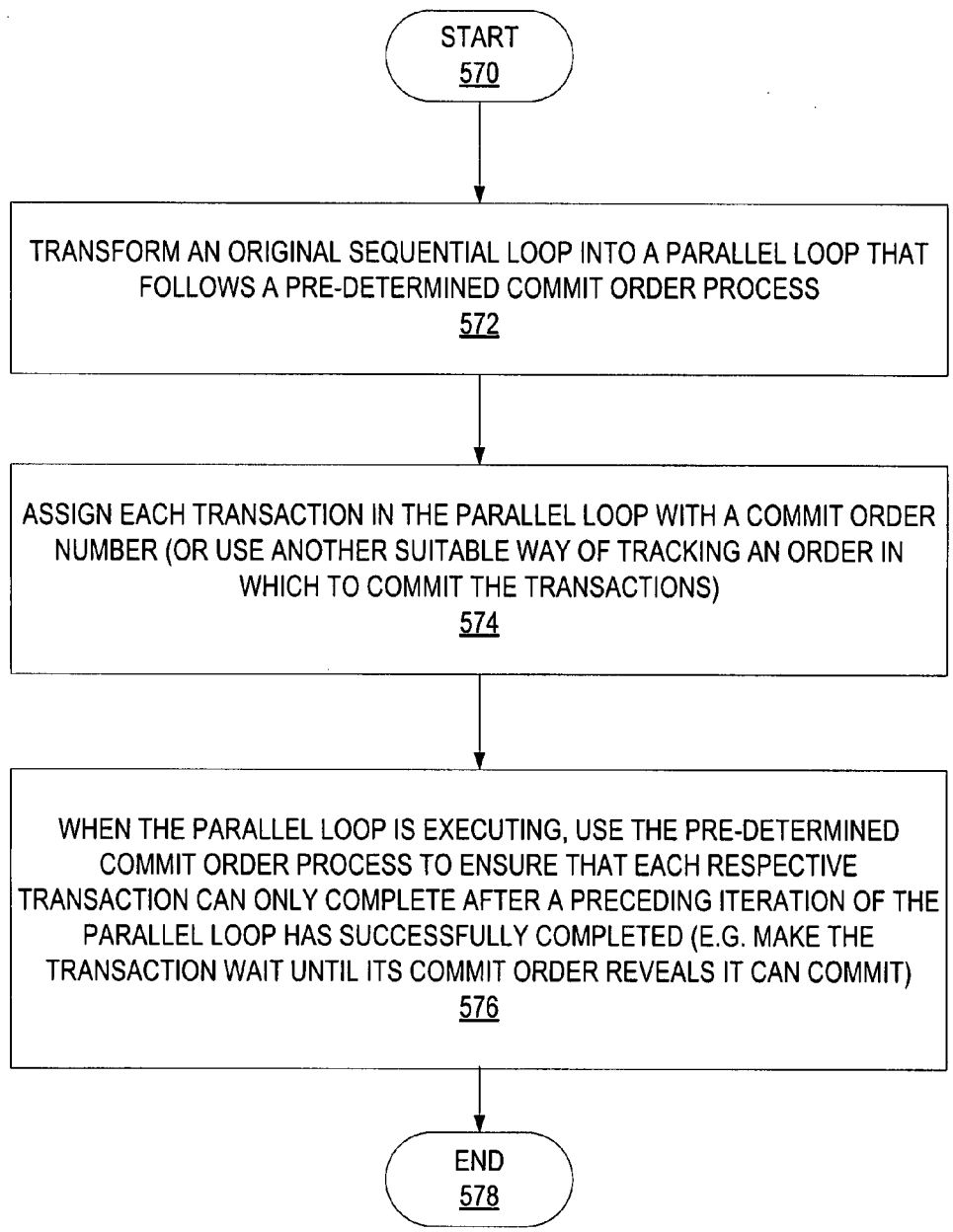
FIG. 15 is a process flow diagram for one implementation of the system of FIG. 1 illustrating the stages involved in using a pre-determined commit order process to ensure that the transactions in the parallel loop are committed in a proper order.

FIG. 15 illustrates one implementation of the stages involved in using a pre-determined commit order process to ensure that the transactions in the parallel loop are committed in a proper order. In one form, the process of FIG. 15 is at least partially implemented in the operating logic of computing device 100. The process begins at start point 570 with transforming an original sequential loop into a parallel loop that follows a pre-determined commit order process (stage 572). The system assigns each transaction in the parallel loop with a commit order number (or uses another suitable way of tracking an order in which to commit the transactions) (stage 574). When the parallel loop is executing, the system uses the pre-determined commit order process to ensure that each respective transaction can only complete after a preceding iteration of the parallel loop has successfully completed (e.g. makes the transaction wait until its commit order reveals it can commit) (stage 576). The process ends at end point 578.

Figure 16:
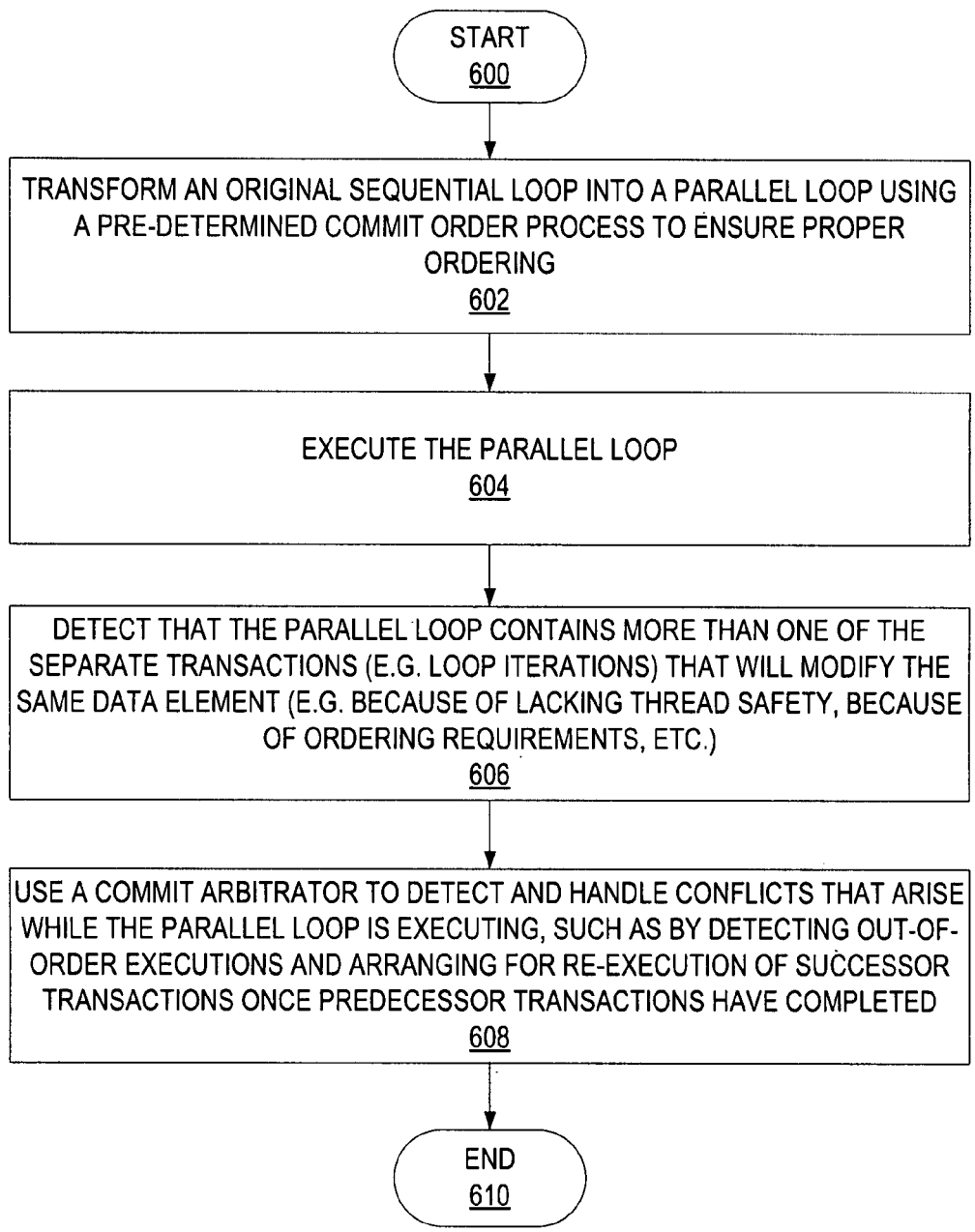
FIG. 16 is a process flow diagram for one implementation of the system of FIG. 1 illustrating the stages involved in using a commit arbitrator to detect and handle conflicts that arise while the parallel loop is executing.

FIG. 16 illustrates one implementation of the stages involved in using a commit arbitrator to detect and handle conflicts that arise while the parallel loop is executing. In one form, the process of FIG. 16 is at least partially implemented in the operating logic of computing device 100. The process begins at start point 600 with transforming an original sequential loop into a parallel loop using a pre-determined commit order process to ensure proper ordering (stage 602). The system executes the parallel loop (stage 604). The system then detects that the parallel loop contains more than one of the separate transactions (e.g. loop iterations) that will modify the same data element (e.g. because of lacking thread safety, because of ordering requirements, etc.) (stage 606). A commit arbitrator is used to detect and handle conflicts that arise while the parallel loop is executing, such as by detecting out-of-order executions and arranging for re-execution of successor transactions once predecessor transactions have completed (stage 608). The process ends at end point 610.

Figure 17:
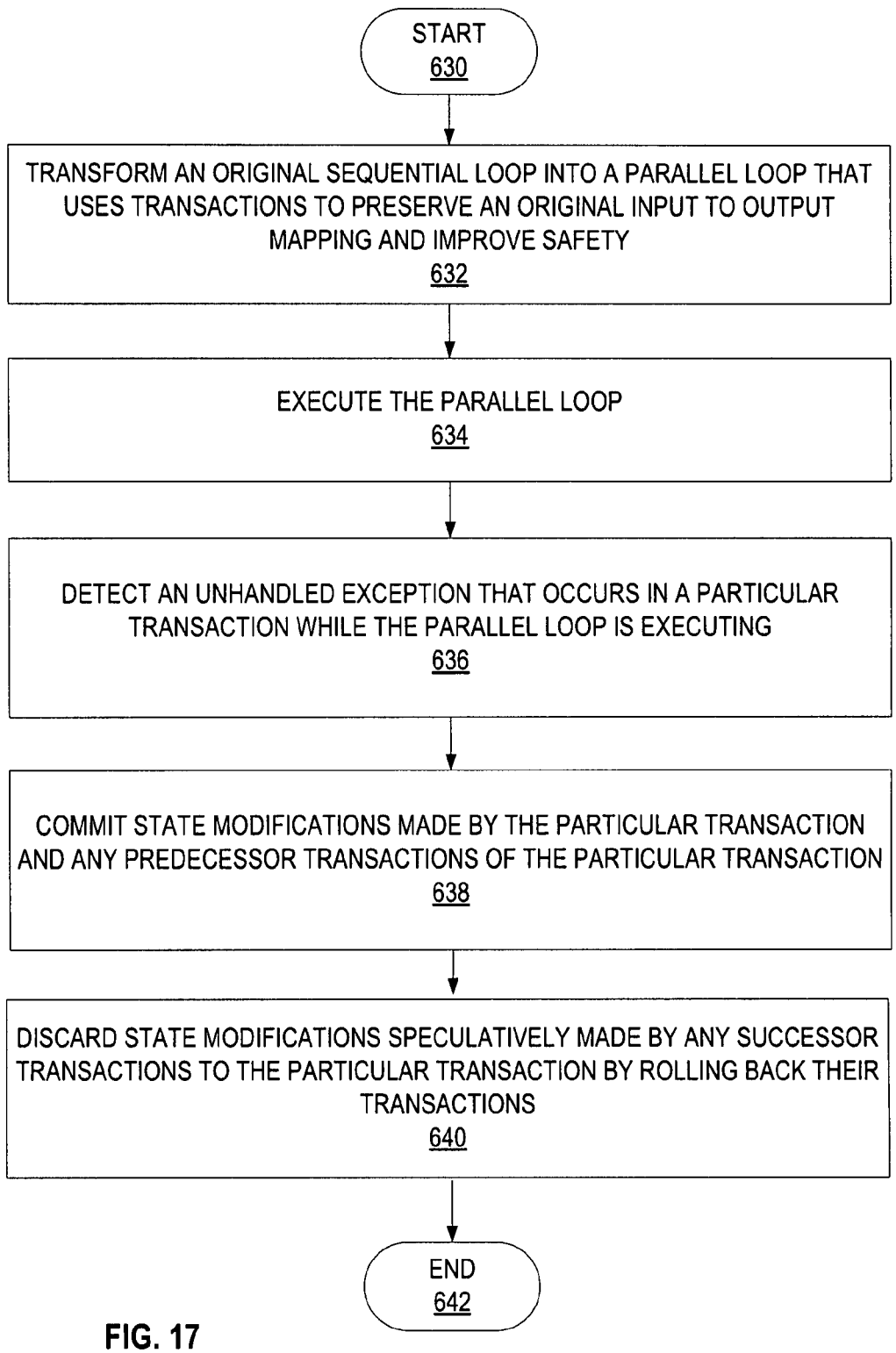
FIG. 17 is a process flow diagram for one implementation of the system of FIG. 1 that illustrates the stages involved in detecting and handling unhandled exceptions that arise while the parallel loop is executing.

FIG. 17 illustrates one implementation of the stages involved in detecting and handling unhandled exceptions that arise while the parallel loop is executing. In one form, the process of FIG. 17 is at least partially implemented in the operating logic of computing device 100. The process begins at start point 630 with transforming an original sequential loop into a parallel loop that uses transactions to preserve an original input to output mapping and improve safety (stage 632). The system executes the parallel loop (stage 634) and detects an unhandled exception that occurs in a particular transaction while the parallel loop is executing (stage 636). The state modifications made by the particular transaction and any predecessor transactions of the particular transaction are committed (stage 638). The state modifications speculatively made by any successor transactions to the particular transaction are discarded by rolling back their transactions (stage 640). The process ends at end point 642.

Figure 18A:
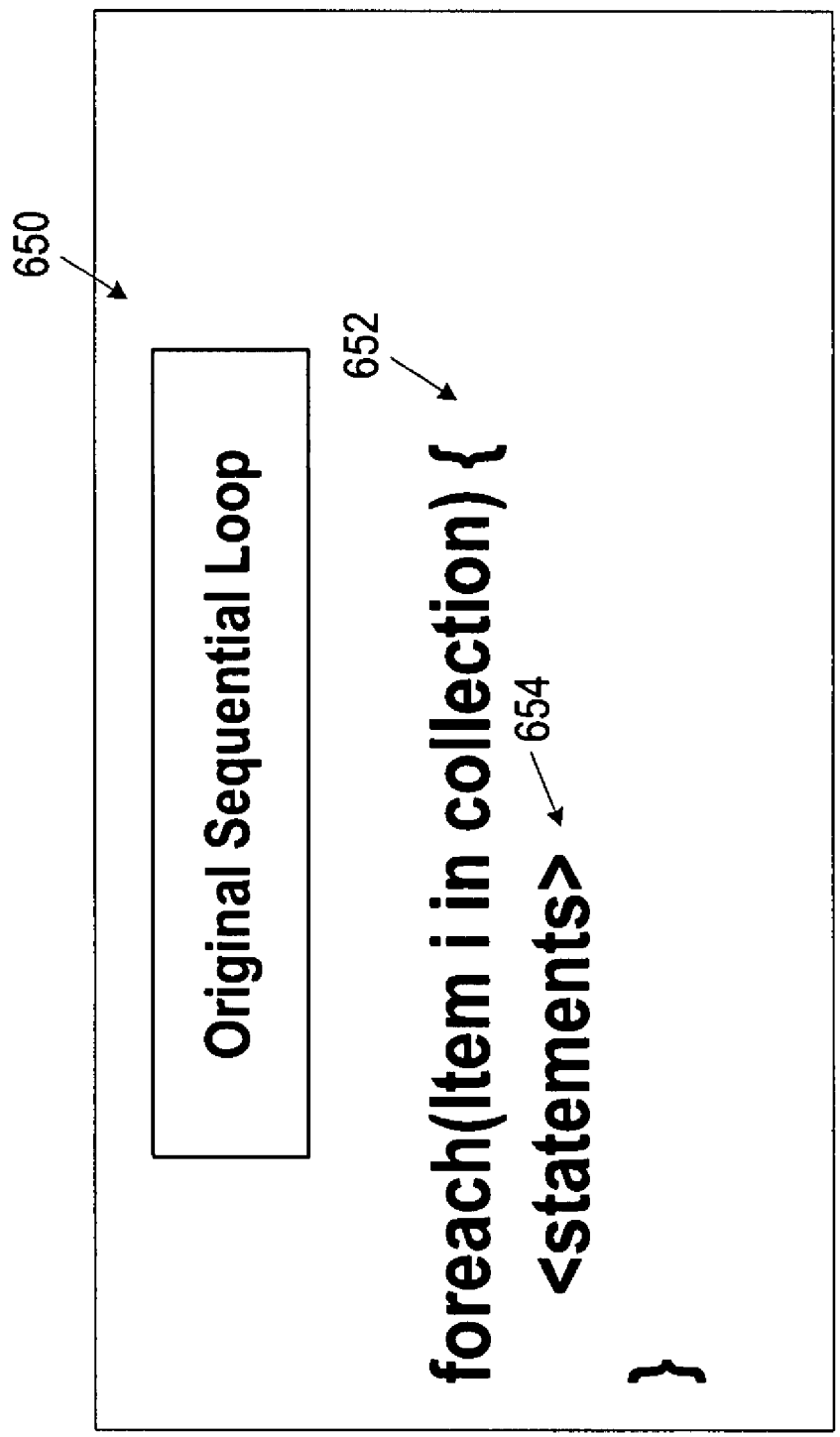

FIGS. 18A-18B illustrate hypothetical source code for an exemplary transformation from an original sequential loop into a parallel loop. While FIG. 18A shows an original sequential loop 650 that contains a for . . . each loop 652, it will be appreciated that other forms of looping constructs can also be used. For each of the iterations in the loop, one or more statements 654 are executed. FIG. 18B shows a hypothetical example of what the sequential loop could look like after being transformed into a parallel loop 660 using some of the techniques discussed herein. In the example shown, the parallel loop is created by generating a separate transaction for each iteration of the original sequential loop 664. In another implementation, contiguous stripes of iterations (e.g. adjacent ones) can be grouped together in a transaction, in the case that creating one transaction per iteration is deemed too costly. Each separate transaction then creates a new work item for performing the work that was included as the statements 667 in the original loop. A separate class 662 can be used to declare the work item iterations. The separate transactions are then assigned to different threads so they can be executed in parallel.

Figure 19:
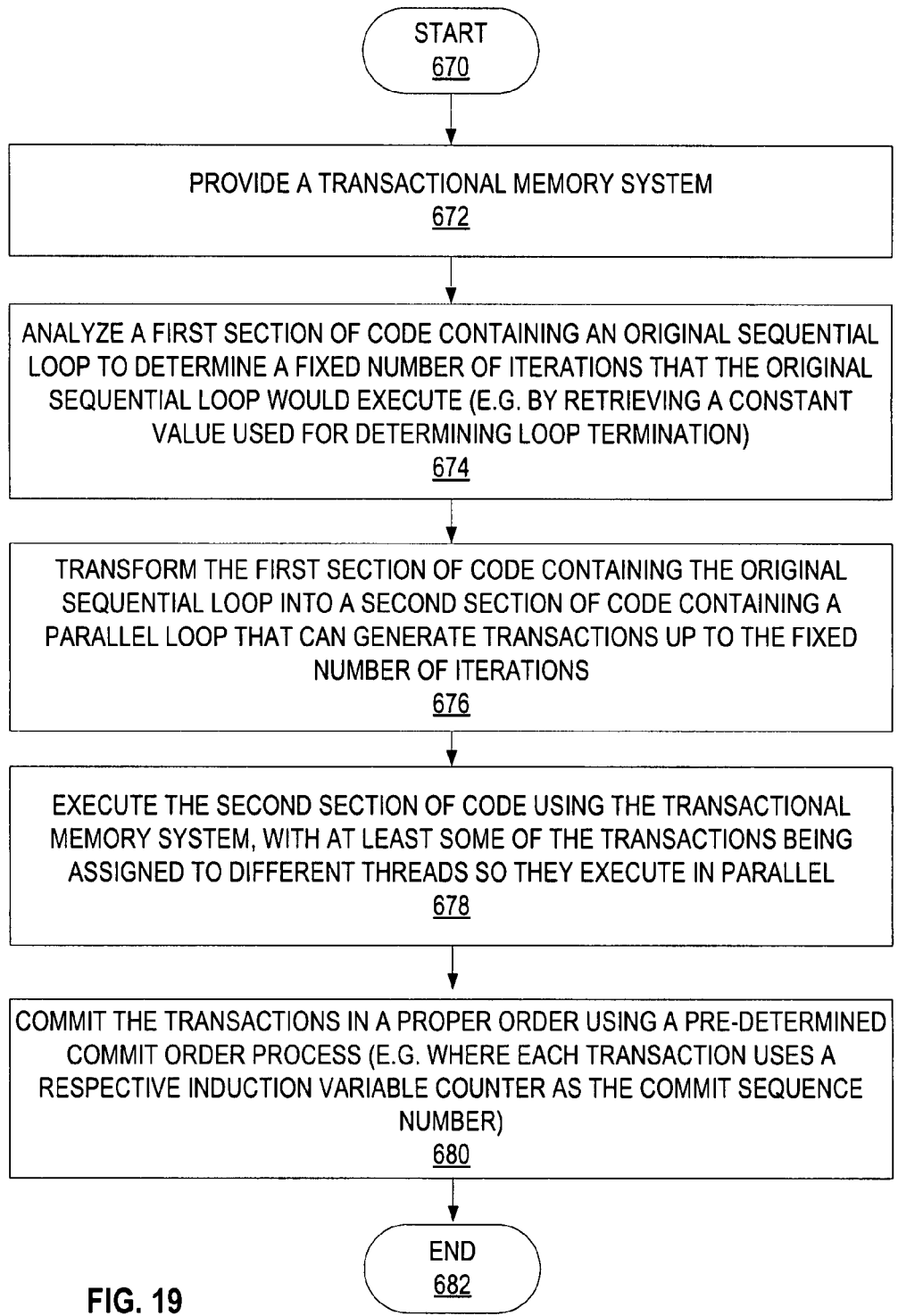
FIG. 19 is a process flow diagram for one implementation of the system of FIG. 1 that illustrates the stages involved in transforming a closed ended sequential loop into a parallel loop.

FIG. 19 illustrates one implementation of the stages involved in transforming a closed ended sequential loop into a parallel loop. In one form, the process of FIG. 19 is at least partially implemented in the operating logic of computing device 100. The process begins at start point 670 with providing a transactional memory system (stage 672). The system analyzes a first section of code containing an original sequential loop to determine a fixed number of iterations that the original sequential loop would execute (e.g. by retrieving a constant value used for determining loop termination) (stage 674). The first section of code containing the original sequential loop is transformed into a second section of code containing a parallel loop that can generate transactions up to the fixed number of iterations (stage 674). The system executes the second section of code using the transactional memory system, with at least some of the transactions being assigned to different threads so they can be executed in parallel (stage 678). The system commits the transactions in a proper order using a pre-determined commit order process (e.g. where each transaction uses a respective induction variable counter as the commit sequence number) (stage 680). The process ends at end point 682.

In one implementation, the transformation process described in FIG. 19 is only used for loops for which the induction variable is never written to in the loop body itself. In other words, a loop could be disqualified by writing to the induction variable in the loop body, or by taking the address of an induction variable and doing something with it that may lead to a write (passing to a function, aliasing it, etc.)

Figure 20:
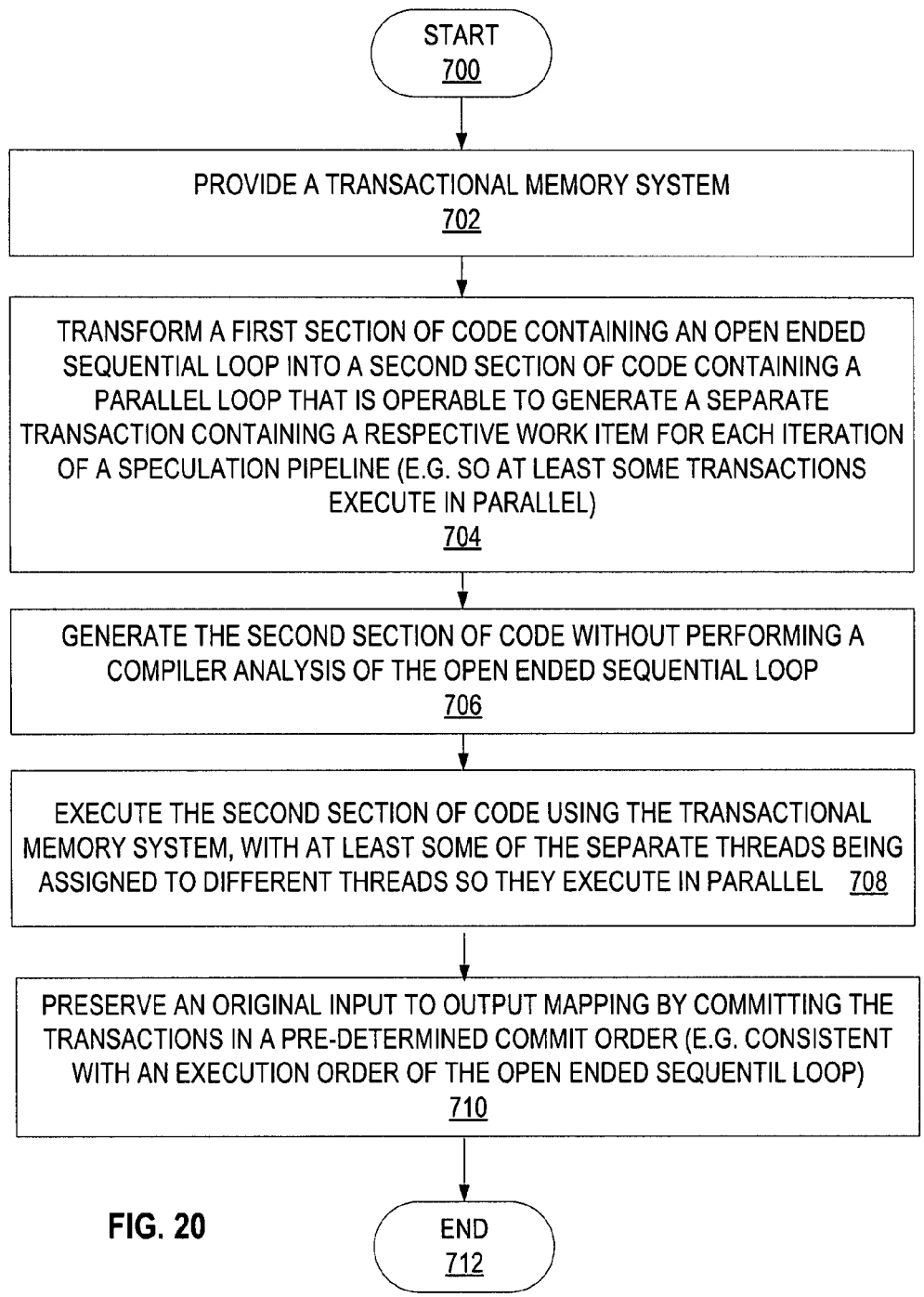
FIG. 20 is a process flow diagram for one implementation of the system of FIG. 1 that illustrates the stages involved in transforming an open ended sequential loop into a parallel loop using a speculation pipeline.

FIG. 20 illustrates one implementation of the stages involved in transforming an open ended sequential loop into a parallel loop using a speculation pipeline. In one form, the process of FIG. 20 is at least partially implemented in the operating logic of computing device 100. The process begins at start point 700 with providing a transactional memory system (stage 702). The system transforms a first section of code containing an open ended sequential loop into a second section of code containing a parallel loop that is operable to generate a separate transaction containing a respective work item for each iteration of speculation pipeline (e.g. so at least some transactions execute in parallel) (stage 704). The second section of code is generated without performing a compiler analysis of the open ended sequential loop (stage 706). The system executes the second section of code using the transactional memory system, with at least some of the separate transactions being assigned to different threads so they execute in parallel (stage 708). An original input to output mapping is preserved by committing the transactions in a pre-determined commit order (e.g. consistent with an execution order of the open ended sequential loop) (stage 710). The process ends at end point 712.

Figure 21:
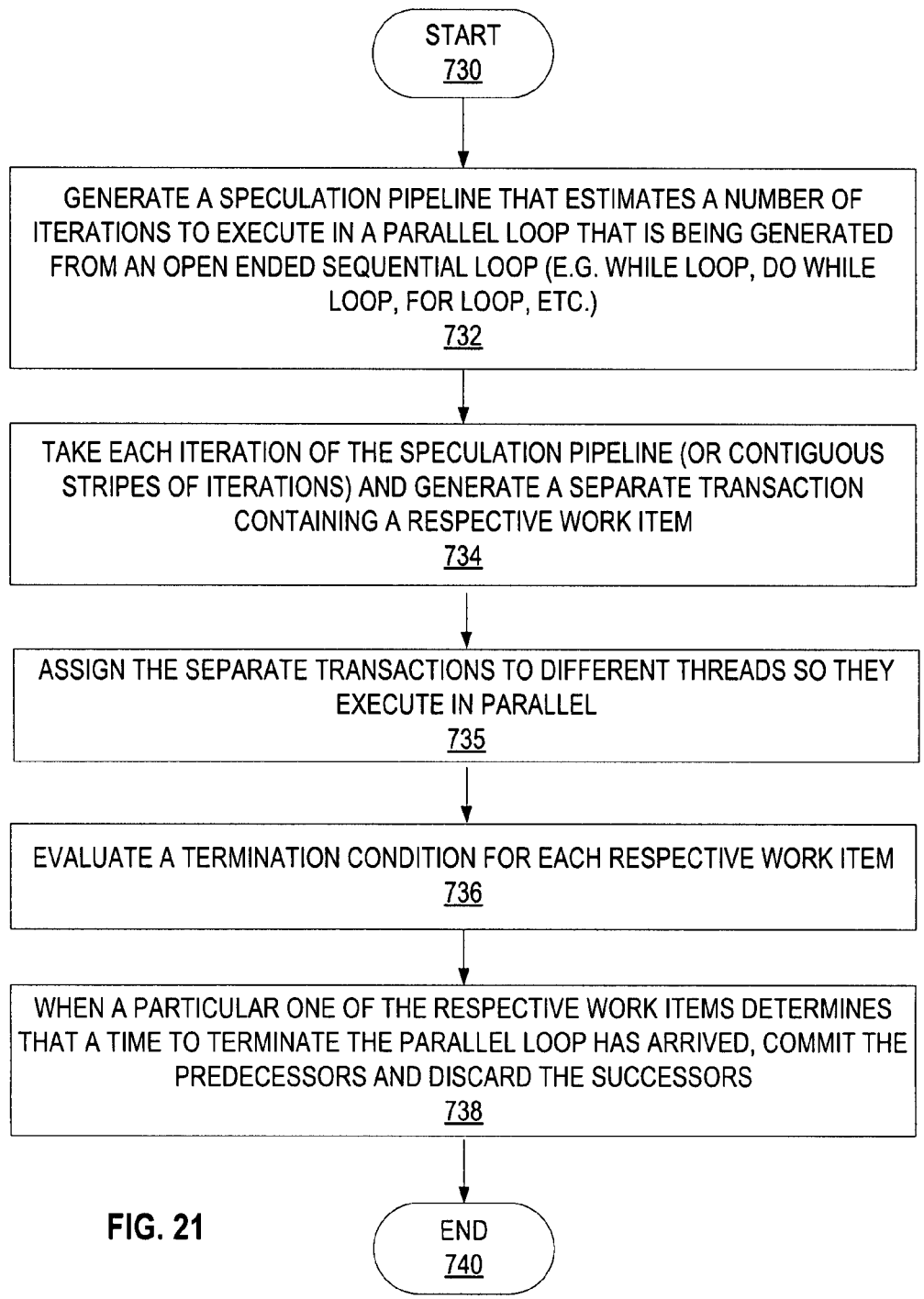
FIG. 21 is a process flow diagram for one implementation of the system of FIG. 1 that illustrates the stages involved in executing a parallel loop that was generated from an open ended sequential loop.

FIG. 21 illustrates one implementation of the stages involved in executing a parallel loop that was generated from an open ended sequential loop. In one form, the process of FIG. 21 is at least partially implemented in the operating logic of computing device 100. The process begins at start point 730 with generating a speculation pipeline that estimates a number of iterations to execute in a parallel loop that is being generated from an open ended sequential loop (e.g. while loop, do while loop, for loop, etc.) (stage 732). In one implementation, the system takes each iteration of the speculation pipeline and generates a separate transaction containing a respective work item (stage 734). In another implementation, the system takes contiguous stripes of iterations (e.g. adjacent ones) and groups them together into a transaction, such as in the case that creating one transaction per iteration is deemed too costly (stage 734). The system assigns the separate transactions to different threads so they execute in parallel (stage 735). The system evaluates a termination condition for each respective work item (stage 736). When a particular one of the respective work items determines that a time to terminate the parallel loop has arrived, the predecessors are committed and the successors are discarded (stage 738). The process ends at end point 740.

Figure 22:
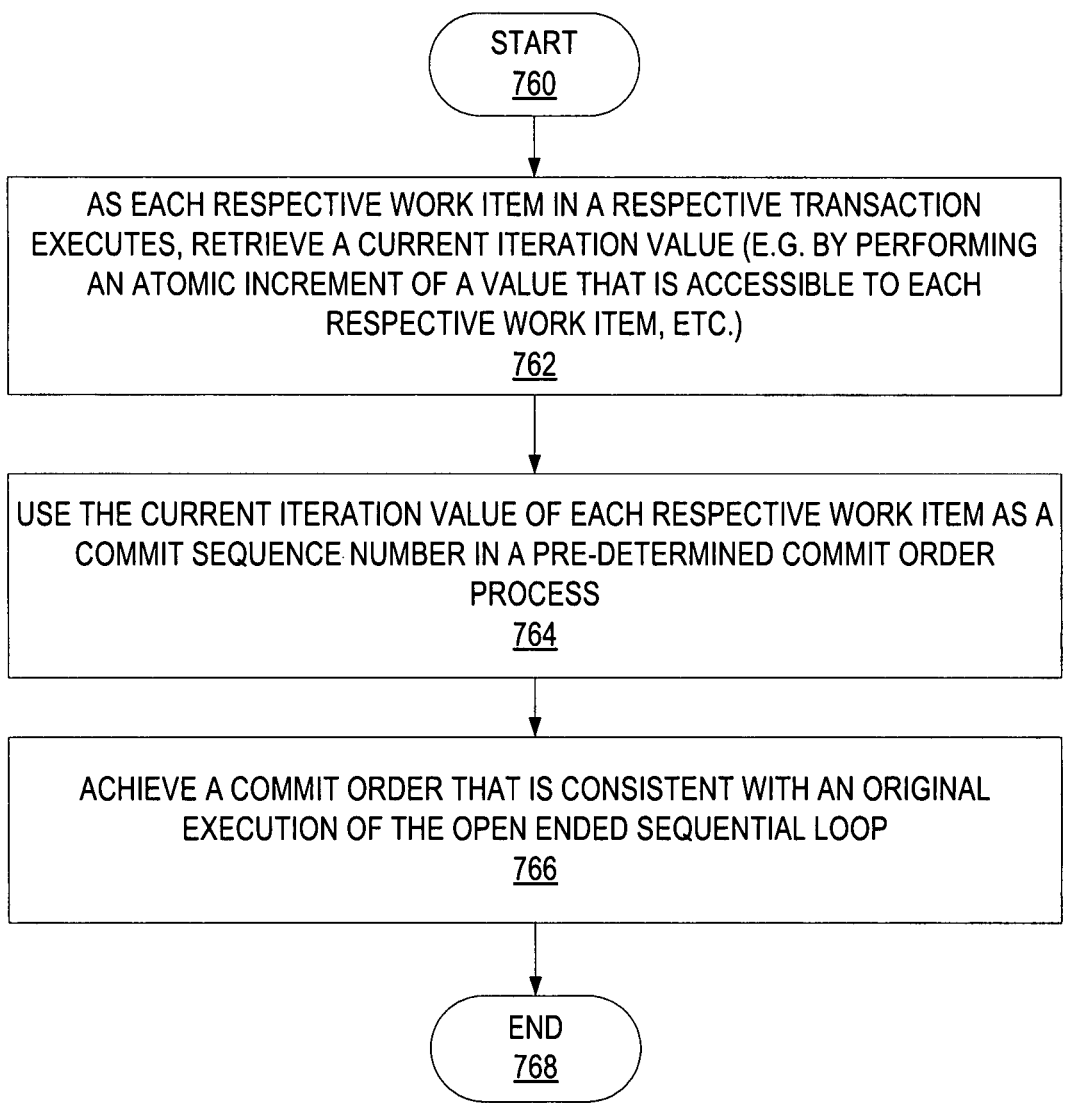
FIG. 22 is a process flow diagram for one implementation of the system of FIG. 1 that illustrates the stages involved in ensuring each work item in the parallel loop that was generated from the open ended sequential loop commits in a proper order.

FIG. 22 illustrates one implementation of the stages involved in ensuring each work item in the parallel loop that was generated from the open ended sequential loop commits in a proper order. In one form, the process of FIG. 22 is at least partially implemented in the operating logic of computing device 100. The process begins at start point 760 with retrieving a current iteration value as each respective work item in a respective transaction executes (stage 762). In one implementation, the current iteration value is retrieved by performing an atomic increment of value that is accessible to each respective work item. (stage 762). The system uses the current iteration value of each respective work item as a commit sequence number in a pre-determined commit order process (stage 764). The system achieves a commit order that is consistent with an original execution of the open ended sequential loop (stage 766). The process ends at end point 768.

Figure 23:
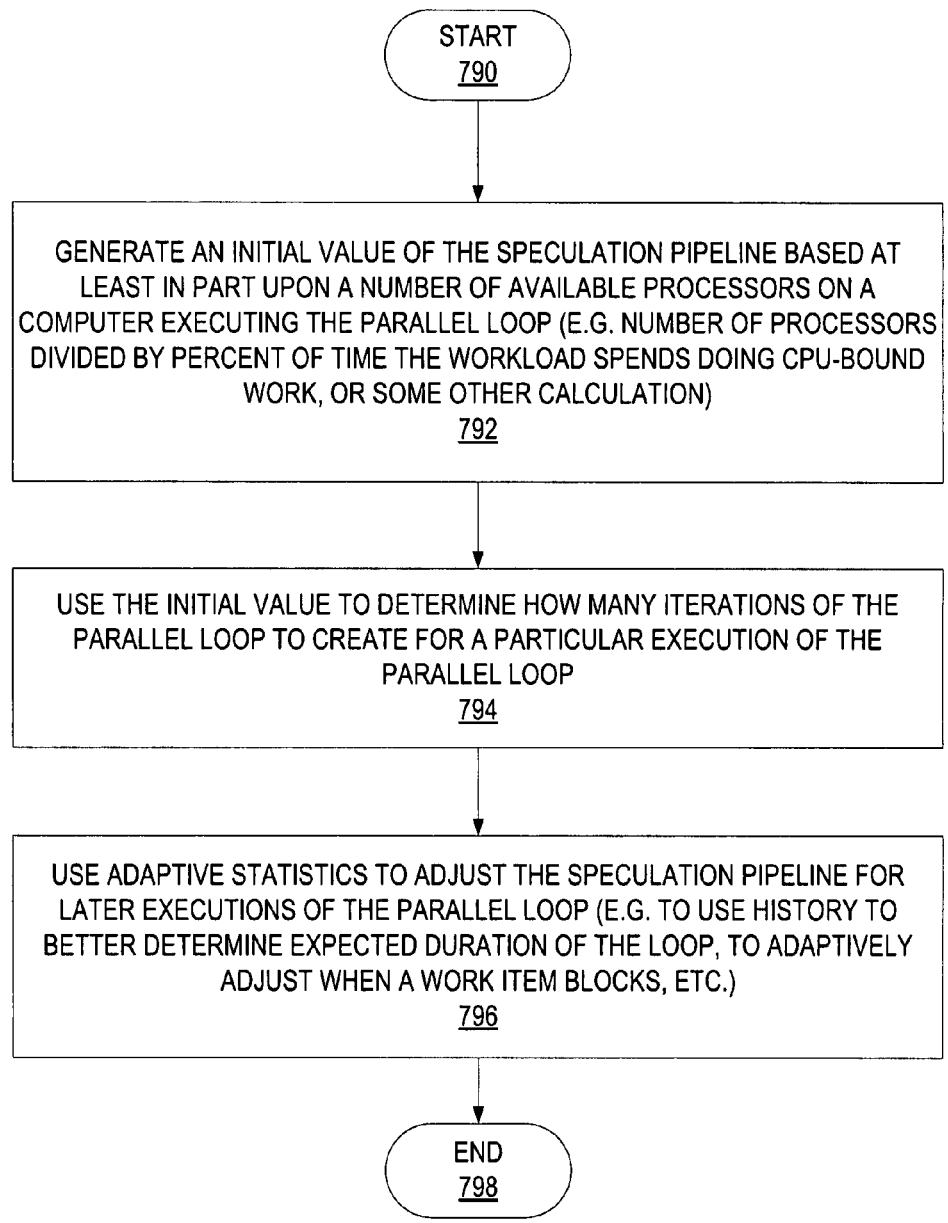
FIG. 23 is a process flow diagram for one implementation of the system of FIG. 1 that illustrates the stages involved in calculating a speculation pipeline to determine how many iterations to include in the parallel loop.

FIG. 23 illustrates one implementation of the stages involved in calculating a speculation pipeline to determine how many iterations to include in the parallel loop. In one form, the process of FIG. 23 is at least partially implemented in the operating logic of computing device 100. The process begins at start point 790 with the system generating an initial value of the speculation pipeline based at least in part upon a number of available processors on a computer executing the parallel loop (stage 792). In one implementation, the initial value of the speculation pipeline is calculated based upon the number of processors divided by percent of the time the workload spends doing CPU-bound work (stage 792). Numerous other calculations could also be used. The initial value is used to determine how many iterations of the parallel loop to create for a particular execution of the parallel loop (stage 794). The system can use adaptive statistics to adjust the speculation pipeline for later executions of the parallel loop (e.g. to use history to better determine expected duration of the loop, to adaptively adjust when a work item blocks, etc.) (stage 796). The process ends at end point 798.

FIGS. 24A-24B illustrate hypothetical source code for an exemplary transformation from an original open ended sequential loop into a parallel loop. The term "open ended sequential loop" is meant to include sequential loops whose number of iterations is unknown. As shown in FIG. 24A, an original open ended sequential loop 810 is shown. The loop is a while loop that performs certain statements while the condition is true (e.g. while P=true in the example shown). FIG. 24B illustrates how the original open ended sequential loop has been converted into a parallel loop 820. As shown in the hypothetical code of FIG. 24B, for each iteration of the speculation pipeline, a work item is generated that may run in parallel. In one implementation, a standard work stealing queue may be used for this. A shared variable called currentIteration is accessible to each work item. As each work item executes, it performs an atomic increment on currentIteration, such as by standard compare-and-swap hardware instructions or another mechanism, to fetch its own iteration value. This ensures that any one iteration is only handled by a single worker and that the order in which transactions began to execute one of the loop's iterations can be determined. This then becomes the transaction's commit sequence number and ensures that the iteration is serializable among predecessors and successors in the correct order. Each work item evaluates P or whatever termination condition is applicable before or after the work, as the looping construct dictates (e.g. before in the case of "while" shown in FIG. 24B, but "after" in the case of do-while). When the realization is made by one of the workers that it is time to terminate, all predecessors must commit, and then all successors must be discarded.

Although the examples discussed herein talked about enforcing commit ordering using various technologies and techniques, it should be noted that a transaction may not have a commit arbitrator at all. In such a case that a transaction does not have a commit arbitrator at all, a normal unordered commit will occur.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. All equivalents, changes, and modifications that come within the spirit of the implementations as described herein and/or by the following claims are desired to be protected.

For example, a person of ordinary skill in the computer software art will recognize that the client and/or server arrangements, user interface screen content, and/or data layouts as described in the examples discussed herein could be organized differently on one or more computers to include fewer or additional options or features than as portrayed in the examples.

What is claimed is:

1. A computer storage medium having computer-executable instructions for causing a computer to perform steps comprising:
   provide a transactional memory system;
   transform a first section of code containing an original sequential loop into a second section of code containing a parallel loop that uses a plurality of transactions to preserve an original input to output mapping; and
   execute the second section of code using the transactional memory system, with at least some of the plurality of transactions being executed on different threads, wherein if the original sequential loop is determined to be immune to reordering, then the second section of code is created in a manner that allows each of the transactions to commit in an order that does not depend on an execution order of the original sequential loop.

2. The computer storage medium of claim 1, wherein each iteration in the original sequential loop is placed into a work item in a separate one of the transactions in the parallel loop.

3. The computer storage medium of claim 1, wherein stripes of adjacent iterations in the original sequential loop are placed into a work item in a separate one of the transactions in the parallel loop.

4. The computer storage medium of claim 1, wherein the second section of code is generated so that at least some of the transactions are executed in parallel.

5. The computer storage medium of claim 1, wherein the second section of code is generated without performing a compiler analysis of the original sequential loop.

6. The computer storage medium of claim 1, wherein the original input to output mapping is preserved by committing the transactions in a pre-determined commit order.

7. The computer storage medium of claim 6, wherein the pre-determined commit order is consistent with an execution order of the original sequential loop.

8. The computer storage medium of claim 1, wherein if the original sequential loop contains operations that modify data, then a commit arbitrator is used to detect and handle conflicts in the parallel loop.

9. The computer storage medium of claim 1, wherein the immunity to reordering is determined using heuristics.

10. The computer storage medium of claim 1, wherein the immunity to reordering is determined upon analyzing a user-defined annotation in the first section of code.

11. A method for transforming an original sequential loop into a parallel loop comprising the steps of:
    using a computing device, transforming an original sequential loop into a parallel loop by taking each iteration of the original sequential loop and generating a separate transaction that follows a pre-determined commit order process, thereby respecting a commit order consistent with an original execution of the original sequential loop; and
    executing the parallel loop, with at least some of the separate transactions being executed on different threads, wherein if the parallel loop is detected to contain more than one of the separate transactions that will modify a same data element, then using a commit arbitrator to detect and handle conflicts that arise while the parallel loop is executing.

12. The method of claim 11, wherein the parallel loop is generated without performing a compiler analysis of the original sequential loop.

13. The method of claim 11, wherein the separate transaction that is generated for each iteration of the original sequential loop includes a respective work item.

14. The method of claim 11, wherein the pre-determined commit order process ensures that each respective transaction can only complete after a preceding iteration of the parallel loop has successfully completed.

15. The method of claim 11, wherein the pre-determined commit order process assigns a commit order number to each of the separate transactions.

16. A computer storage medium having computer-executable instructions for causing a computer to perform the steps recited in claim 11.

17. A method for properly handling exceptions that arise in a parallel loop that was generated from an original sequential loop comprising the steps of:
    using a computing device, tansforming an original sequential loop into a parallel loop that uses transactions to preserve an original input to output mapping;
    executing the parallel loop, with at least some of the transactions being executed on separate threads;
    detecting an unhandled exception that occurs in a particular transaction while the parallel loop is executing;
    committing state modifications made by the particular transaction and any predecessor transactions of the particular transaction; and
    discarding state modifications made by any successor transactions of the particular transaction.

18. A computer storage medium having computer-executable instructions for causing a computer to perform the steps recited in claim 17.

* * * * *

UNITED STATES PATENT AND TRADEMARK OFFICE
CERTIFICATE OF CORRECTION

| | | |
|---|---|---|
| PATENT NO. | : 8,010,550 B2 | Page 1 of 1 |
| APPLICATION NO. | : 11/810121 | |
| DATED | : August 30, 2011 | |
| INVENTOR(S) | : John Joseph Duffy et al. | |

It is certified that error appears in the above-identified patent and that said Letters Patent is hereby corrected as shown below:

In column 16, line 45, in Claim 17, delete "tansforming" and insert -- transforming --, therefor.

Signed and Sealed this

Twenty-second Day of November, 2011

David J. Kappos
*Director of the United States Patent and Trademark Office*